United States Patent [19]
Nota et al.

[11] Patent Number: 5,805,790
[45] Date of Patent: Sep. 8, 1998

[54] FAULT RECOVERY METHOD AND APPARATUS

[75] Inventors: Tadashi Nota; Masaichiro Yoshioka, both of Sagamihara; Seiji Nagai, Atsugi; Shunji Tanaka, Sagamihara; Toshiyuki Kinoshita, Tokyo, all of Japan

[73] Assignee: Hitachi, Ltd., Tokyo, Japan

[21] Appl. No.: 620,846

[22] Filed: Mar. 20, 1996

[30] Foreign Application Priority Data

Mar. 23, 1995 [JP] Japan .................................... 7-090314

[51] Int. Cl.⁶ ...................................................... G06F 11/34
[52] U.S. Cl. ............................... 395/182.08; 395/182.18; 395/182.21
[58] Field of Search ...................................... 395/180, 181, 395/182.01, 182.08, 182.09, 182.1, 182.11, 182.13, 182.14, 182.15, 182.18, 182.21

[56] References Cited

U.S. PATENT DOCUMENTS

| 4,488,228 | 12/1984 | Crudele et al. . |
| 4,493,035 | 1/1985 | MacGregor et al. . |
| 4,524,415 | 6/1985 | Mills, Jr. et al. ................... 395/182.19 |
| 4,533,996 | 8/1985 | Hartung et al. . |
| 4,625,081 | 11/1986 | Lotito et al. ............................ 549/392 |
| 4,674,038 | 6/1987 | Brelsford et al. . |
| 5,193,162 | 3/1993 | Bordsen et al. . |

Primary Examiner—Albert DeCady
Attorney, Agent, or Firm—Antonelli, Terry, Stout & Kraus, LLP

[57] ABSTRACT

In a fault recovery method for a multi-processor system including a main storage and a plurality of virtual machines which are assigned to a plurality of processors under control of a host operating system and a plurality of guest operating systems and which operate on the processors associated therewith, a fault occurring in one of the processors is detected to recover functions of the system. The method includes the steps of setting recovery attributes for failure to each of the virtual machines, assigning a plurality of virtual machines to a plurality of processors and operating the virtual machines on the processors respectively associated therewith, storing, at detection of occurrence of a fault in one of the processors, data and status information of virtual machines assigned to the processor and status information of the processor respectively in a virtual machine save area and a real machine save area of the main storage, storing fault information of the processor in the main storage by a fault recovery circuit having received a report of the fault, restarting an interrupted process and causing an interruption according to the status information of the virtual machines and the status information and fault information of the processor which are obtained from the main storage, and retrieving, when the interruption is received, one of the virtual machines assigned to the processor according to the processor status information in the real machine save area and then assigning the plural virtual machines to the plural processors for operation thereof according to the recovery attributes for failure set to the retrieved virtual machine.

20 Claims, 18 Drawing Sheets

| GUEST | SPECIFIED ATTRIBUTE | ASSIGNED PROCESSOR NO |
|---|---|---|
| GUEST OS1 | IMPORTANT GUEST | 1 |
| GUEST OS2 | ORDINARY GUEST | 2 |
| GUEST OS3 | ORDINARY GUEST | 2 |

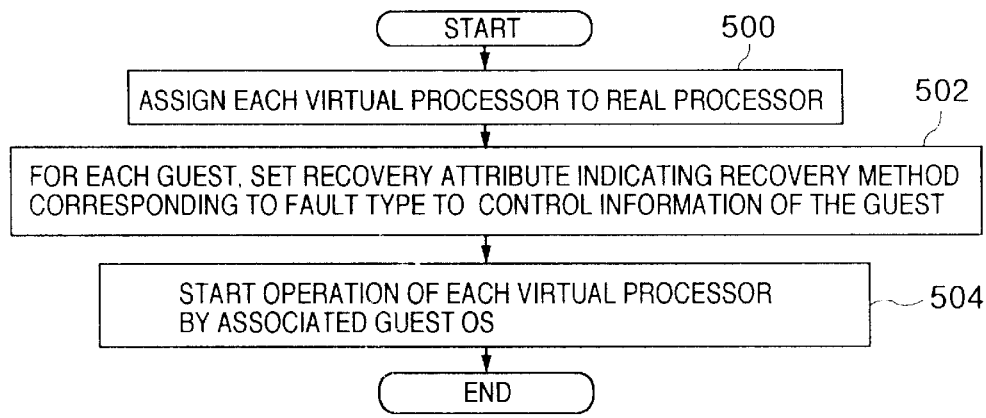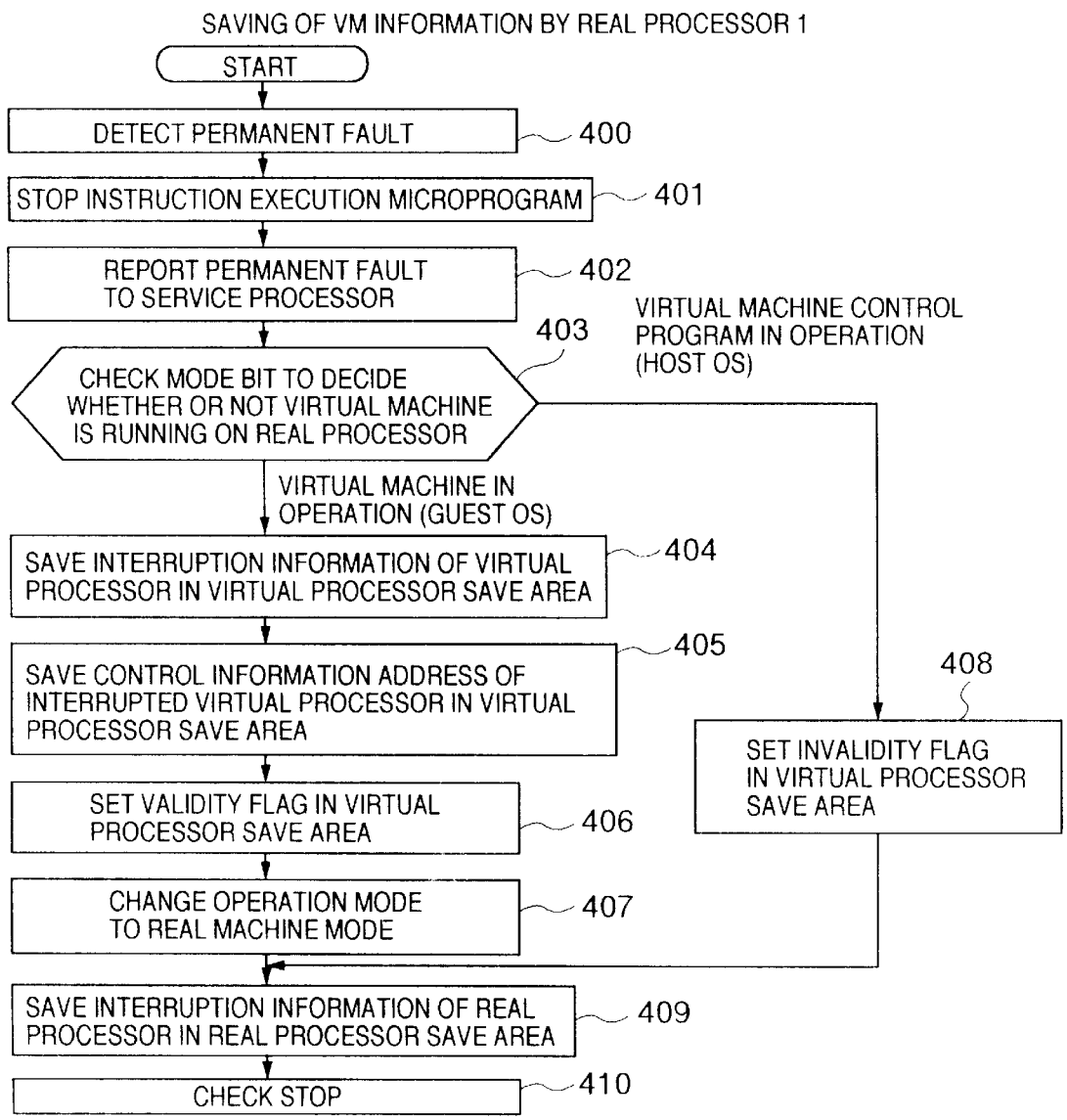

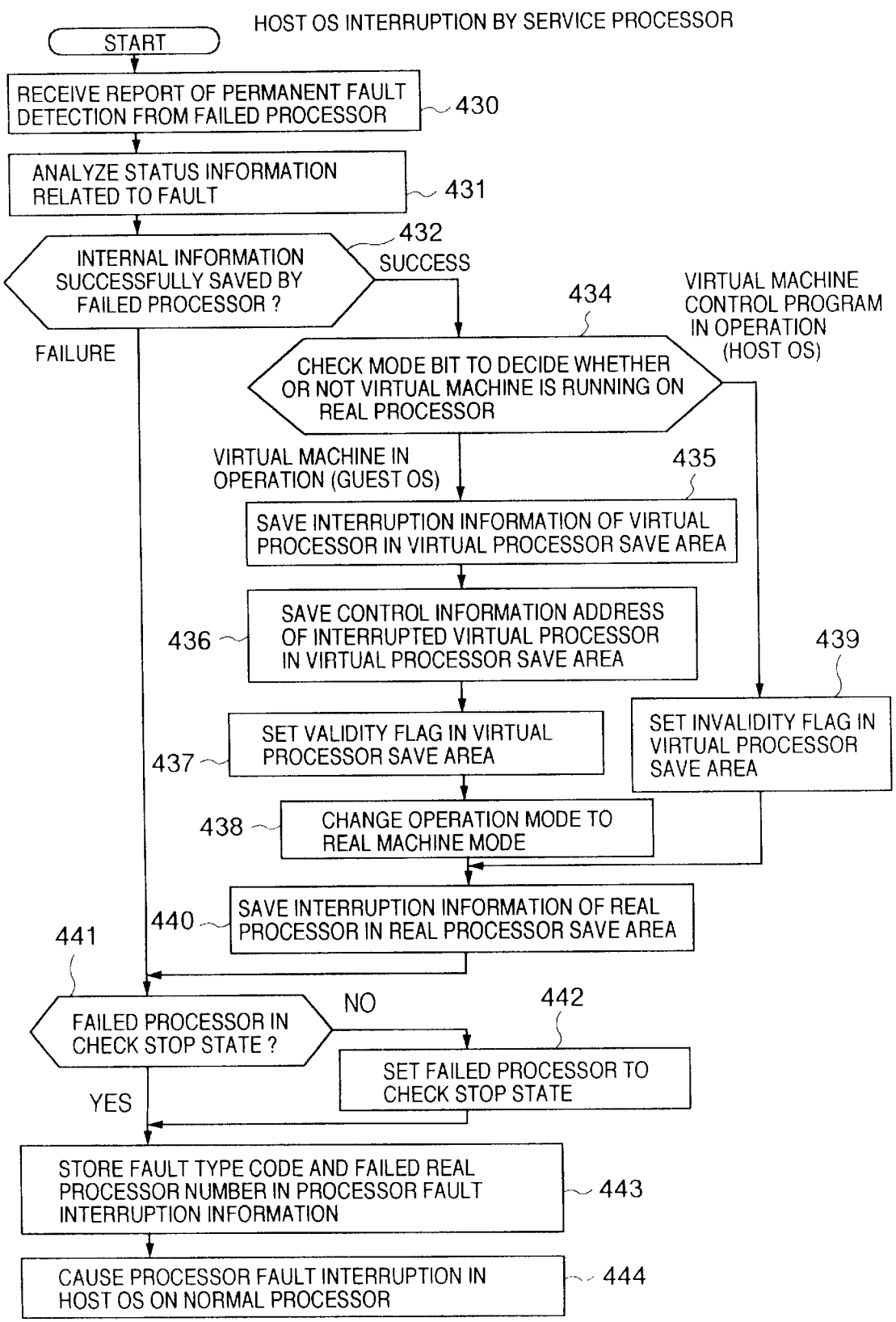

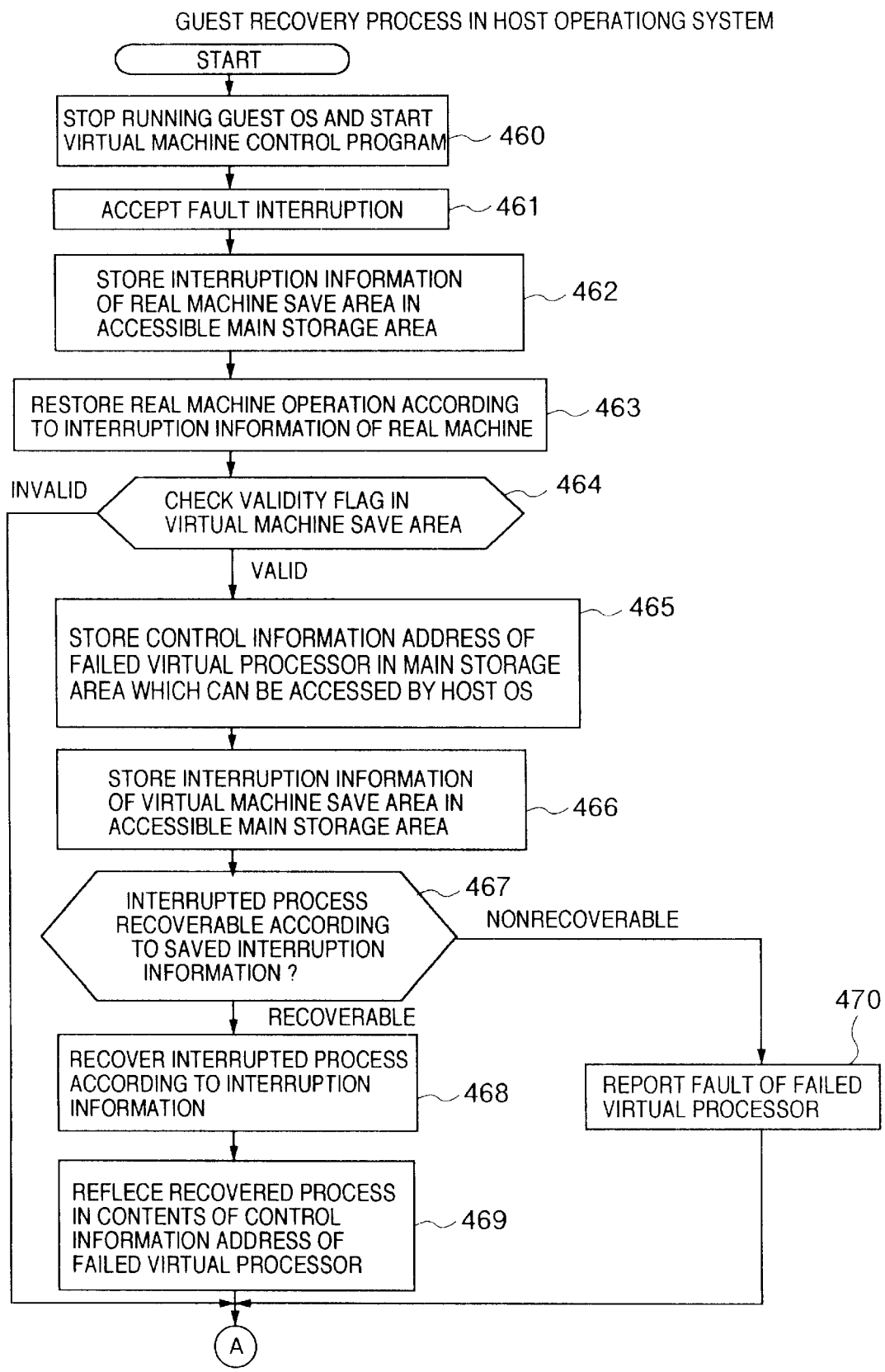

| GUEST | SPECIFIED ATTRIBUTE | ASSIGNED PROCESSOR NO |
|---|---|---|
| GUEST OS1 | IMPORTANT GUEST | 2 |
| GUEST OS2 | ORDINARY GUEST | NONE (HALT STATE) |
| GUEST OS3 | ORDINARY GUEST | NONE (HALT STATE) |

| GUEST | SPECIFIED ATTRIBUTES | | ASSIGNED PROCESSOR NO | REAL PROCESSOR UTILIZATION RATIO |
| --- | --- | --- | --- | --- |
| | IMPORTANT/ ORDINARY | REAL PROCESSOR UTILIZATION RATIO AT RECOVERY | | |
| GUEST OS1 | ORDINARY GUEST | 90 % | 1 | 90 % |
| GUEST OS2 | ORDINARY GUEST | 0 % | 1 | 10 % |
| GUEST OS3 | ORDINARY GUEST | 20 % | 2 | 100 % |

FIG.12

| GUEST | SPECIFIED ATTRIBUTES | | ASSIGNED PROCESSOR NO | REAL PROCESSOR UTILIZATION RATIO |
| --- | --- | --- | --- | --- |
| | IMPORTANT/ ORDINARY | REAL PROCESSOR UTILIZATION RATIO AT RECOVERY | | |
| GUEST OS1 | ORDINARY GUEST | 90 % | 2 | 72% |
| GUEST OS2 | ORDINARY GUEST | 0 % | 2 | 8 % |
| GUEST OS3 | ORDINARY GUEST | 20 % | 2 | 20 % |

| GUEST | REAL PROCESSOR 1 | REAL PROCESSOR 2 |
|---|---|---|
| GUEST OS1 | VIRTUAL PROCESSOR 1 ONLINE | VIRTUAL PROCESSOR 2 ONLINE |
| GUEST OS2 | VIRTUAL PROCESSOR 1 ONLINE | — |
| GUEST OS3 | — | VIRTUAL PROCESSOR 1 ONLINE |

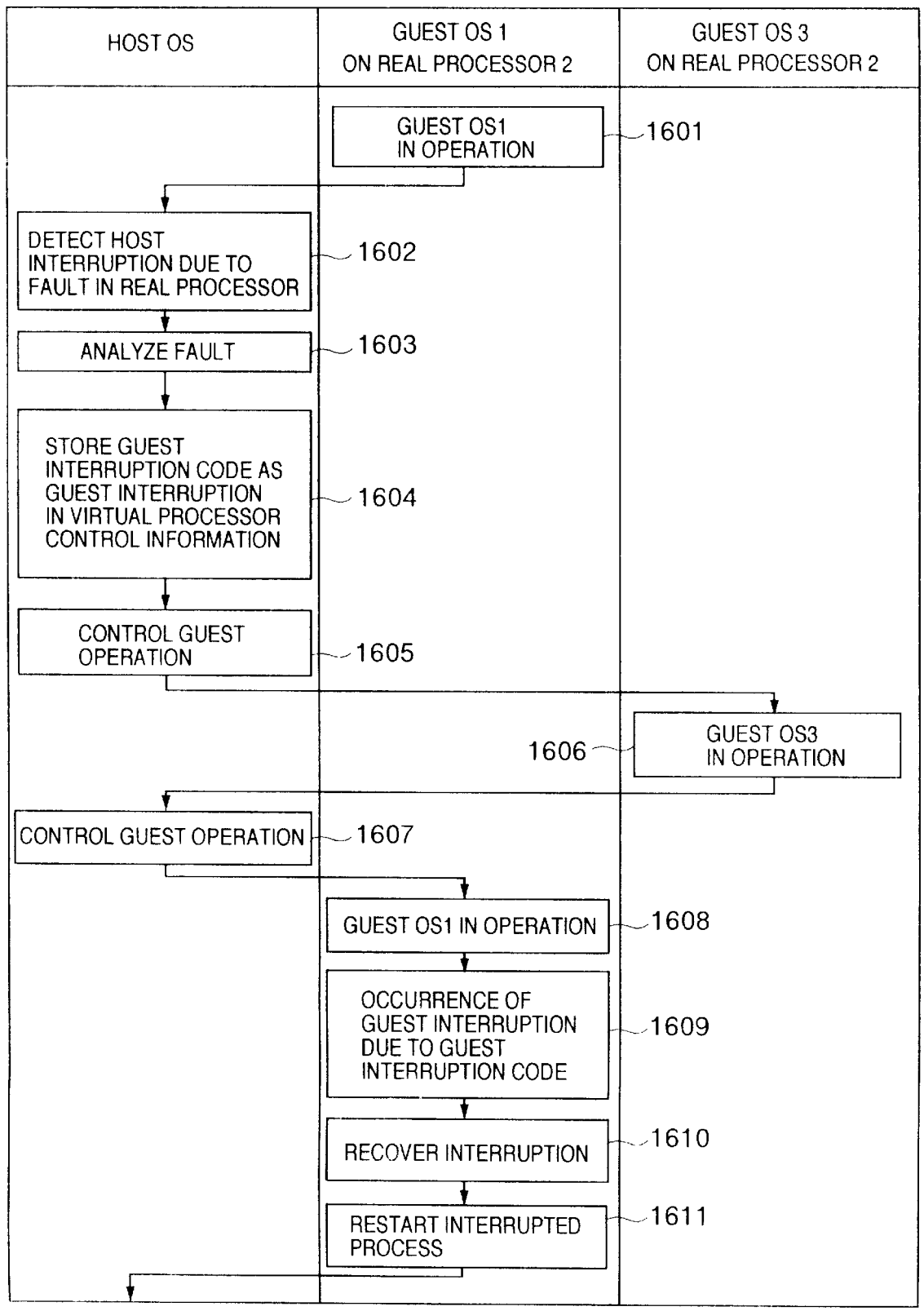

FAULT RECOVERY METHOD AND APPARATUS

BACKGROUND OF THE INVENTION

The present invention relates to a fault recovery method for use in a computer system, and in particular, to a fault recovery method to be used when a fault occurs in a real processor during an operation of a virtual machine or computer system and a fault recovery method to be employed when a permanent fault takes place in a real processor in an operation of a logical partition resource or computer system.

In a virtual machine system in which a plurality of virtual machines (to be referred to as virtual machines or guests herebelow) concurrently achieve their operations on one real computer or machine, there is utilized a host operating system (host OS; the hardware and host operating system are also collectively referred to as a host depending on cases) as a control program to supervise the guests. For example, the host operating system controls operations of the scheduling, dispatching, and instruction simulations for the virtual machines. Moreover, there has been known a logical partition system in which the host operating system seems to be a hardware feature in the virtual machine system, i.e., it seems as if the real computer or machine were logically subdivided into partitions for the users of the system. The system operates in a mode (guest mode) in which virtual machine is running or in a mode (host mode) in which the host operating system is running.

When the operation of the real processor is changed from the host mode to the guest mode, the processor moves therefrom execution information related to the host mode execution to a program storage area (PSA) or a hardware storage area (HSA) of a main storage and then accesses the main storage to obtain therefrom execution information related to the guest mode execution.

Conversely, when the operation of the real processor is altered from the guest mode to the host mode, the processor moves therefrom execution information related to the guest mode execution to the main storage and then moves the execution information related to the host mode execution from the PSA and HSA of the main storage.

Examples of the virtual machine and logical partition systems have been described, for example, in the JP-A-57-212680 (corresponding to the U.S. patent application Ser. No. 273,532 filed on Jun. 15, 1981), JP-A-64-37636 (corresponding to the U.S. patent application Ser. No. 079,314 filed on Jul. 29, 1987), JP-A-2-96246 (corresponding to the U.S. patent application Ser. No. 209,505 filed on Jul. 21, 1988), and JP-A-5-181823 (corresponding to the U.S. patent application Ser. No. 576,344 filed on Aug. 31, 1990).

According to the JP-A-64-53238, there has been described an example of fault recovery technology in a virtual computer system. In this technology, a fault recovery is achieved for a virtual machine of which the processing is interrupted due to a failure in the host operating system and/or a fault in the real computer system. Specifically, the function to conduct the recovery of a process in the virtual machine interrupted due to a fault of the real computer system is disposed in a virtual machine (VM) monitor (in the host operating system) controlling the plural virtual machines. According to this technology, the process recovery function is not required to be installed on the virtual machine side.

Furthermore, in the JP-A-64-3741, there has been described an environment recovery technology. In this technology, information of a guest which does not have the right of execution and which are in the wait state is saved in a memory such that when a system down takes place in a virtual computer system, the system environment is recovered without restoring the guest in the wait state according to the saved information.

SUMMARY OF THE INVENTION

It is therefore an object of the present invention to provide a method of guaranteeing, in a virtual computer system in which a plurality of virtual machines operate on a multi-processor computer, a state of a virtual processor in operation when a permanent fault occurs in a real processor operating as the virtual processor, the state being guaranteed by another real processor operating as another virtual processor.

Another object of the present invention is to provide a method of restoring, in a logical partition resource system in which a plurality of logical partition resources or machines are operated on a multi-processor computer, a process in an execution wait state in a virtual processor when a permanent failure occurs in a real processor allocated to the virtual processor.

Still another object of the present invention is to provide a multi-processor computer system capable of conducting recovery of processes at fault interruption in guest operating systems of a plurality of different kinds according to the kinds and versions of the operating systems.

To achieve the objects above, there is provided according to the present invention a fault recovery method, for use in a multi-processor system including a main storage and a plurality of virtual machines which are assigned to a plurality of processors under control of a host operating system and a plurality of guest operating systems and which operate on the processors associated therewith, of detecting a fault occurring in one of the processors and thereby recovering functions of the system. The method includes the steps of setting recovery attributes for failure to each of the virtual machines, assigning a plurality of virtual machines to a plurality of processors and operating the virtual machines on the processors respectively associated therewith, storing, at detection of occurrence of a fault in one of the processors, data and status information of virtual machines assigned to the processor and status information of the processor respectively in a virtual machine save area and a real machine save area of the main storage, storing fault information of the processor in the main storage by a fault recovery circuit having received a report of the fault, restarting an interrupted process and causing an interruption according to the status information of the virtual machines and the status information and fault information of the processor, the information being obtained from the main storage, and retrieving, when the interruption is received, one of the virtual machines assigned to the processor according to the processor status information in the real machine save area and then assigning the plural virtual machines to the plural processors for operation thereof according to the recovery attributes for failure set to the retrieved virtual machine.

Additionally, when a virtual machine is in operation at occurrence of the permanent fault in the real processor, state or status information of the virtual machine including interruption information and virtual machine control address and a validity flag indicating validity of the status information are stored in the virtual machine save area.

When a real processor is in operation, a validity flag indicating invalidity of the state information is stored in the virtual machine save area, and the information at interruption of the real processor is stored in the real processor save area.

Furthermore, in the recovery of the process of the failed virtual machine, the validity flag in the virtual machine save area is examined after the fault recovery is completely finished for the real processor to thereby confirm presence or absence of virtual processors interrupted due to the real processor fault.

When such a virtual processor is present, the virtual processor control information address is read from the virtual machine save area to be moved as interruption information of the virtual processor to the main storage.

The obtained interruption information is then reflected in the virtual processor control information address stored in the virtual machine save area.

Moreover, according to the faulty real processor number notified to the normal processor and the virtual machine control information supervised by the virtual machine control program, there is decided a virtual machine assigned with the real processor in which the permanent fault has occurred.

In addition, a virtual machine recovery attribute is set to the virtual machine control information supervised by the control program of each virtual machine running on each real processor.

The recovery information of a virtual machine assigned with the real processor in which the permanent fault occurred is compared with that of a virtual machine to which a normal real processor is assigned.

According to a result of the comparison, there is determined a normal real processor to be assigned to the virtual processor which was assigned with the failed real processor and which has been restored to an executable state.

Moreover, an importance attribute and a non-importance attribute are employed as the recovery attributes for each virtual machine.

As a result of the comparison, when the virtual processor associated with the failed real processor has the importance attribute and the virtual machine assigned with the normal real processor has the non-importance attribute, the operation of the virtual machine related to the normal real processor is stopped such that the normal real processor is allocated to the virtual machine beforehand assigned with the failed real processor to initiate operation of the virtual machine.

When it is decided that the virtual machine associated with the normal real processor has the importance attribute as a result of the comparison, the virtual machine associated with the failed real processor is not restored.

Additionally, as a recovery attribute of the virtual machine, there is employed a utilization ratio of normal real processor of each virtual machine when the virtual machine related to the failed real processor is restored.

When a normal real processor is assigned to a failed virtual machine which is in an executable state and which is associated with the failed real processor, the real processor utilization ratios are allocated to the normally operating virtual machines according to the real processor utilization ratios in the virtual machine recovery. The remaining processor utilization ratio is allocated to the failed virtual machines in the executable state according to the real processor utilization ratios thereof, thereby recovering the failed virtual machines.

When there does not exist any normal processor to be assigned thereto, the failed virtual processors in the executable state are not recovered.

Moreover, according to the importance and non-importance attributes employed as the recovery attributes of the virtual machines, when the non-importance attribute is assigned to the virtual machine, there are assigned utilization ratios of normal real processors of the respective virtual machines in the recovery of the virtual machine assigned with the failed real processor.

As a result of the comparison, when the virtual machine related to the failed real processor has the importance attribute and the virtual machine assigned with the normal real processor has the non-importance attribute, the operation of the virtual machine related to the normal real processor is terminated and the normal real processor is allocated to the virtual machine assigned with the failed real processor so as to start operation of the virtual machine.

When it is determined that the virtual machine associated with the normal real processor has the importance attribute as a result of the comparison, the virtual machine associated with the failed real processor is not recovered.

When the virtual machine related to the failed real processor has the importance attribute and the virtual machine assigned with the normal real processor has the non-importance attribute as a result of the comparison, the real processors are allocated to the failed virtual machines which are in the executable state and which are beforehand allocated to the failed real processor as follows. Namely, the real processor utilization ratios are allocated to the normally operating virtual machines according to the real processor utilization ratios in the virtual machine recovery. The remaining processor utilization ratio is allocated to the failed virtual machines in the executable state according to the real processor utilization ratios thereof, thereby recovering the failed virtual machines.

When there is missing a normal processor to be assigned thereto, the failed virtual processors in the executable state are not restored.

According to the present invention, there is provided a fault recovery method in a logical partition resource system in which a plurality of partition resources operate on one multi-processor computer.

In accordance with the fault recovery method, when a permanent fault occurs in a real processor, interruption information of a virtual machine in a logical partition resource assigned with the failed real processor and an address of virtual machine control information and interruption information of the real processor are stored in a virtual machine save area and a real machine save area, respectively.

The occurrence of failure is reported to a normal real processor. The normal real processor analyzes the fault and obtains the processor number of the failed real processor and an identification code indicating the contents of the fault and then stores the attained items as interruption information in a main storage and causes an interruption therein or in another normal real processor.

The interrupted processor analyzes the fault according to the interruption information and stores a guest interruption code in a control information area of the virtual machine in the logical partition resource assigned with the fault real processor, the code indicating a guest interruption of the guest operating system of the pertinent logical partition resource.

In the normal real processor, when the operation mode is changed from the host OS mode to the guest OS mode of the partition resource, the guest operating system detects the guest interruption code related to the guest operating system and then carries out an interruption recovery process according to the information in the virtual machine save area in association with the occurrence of interruption.

After the interruption recovery, the guest operating system restarts execution of the virtual machine in the logical partition machine assigned with the failed real processor.

According to the present invention, there is provided a fault recovery processing method in a logical partition resource system in which a plurality of partition resources are operated on one multi-processor computer.

In accordance with the fault recovery method, when a permanent fault occurs in a real processor, interruption information of a virtual machine in a logical partition resource assigned with the failed real processor and an address of virtual machine control information and interruption information of the real processor are stored in a virtual machine save area and a real machine save area, respectively.

The occurrence of failure is reported to a normal real processor. The normal real processor analyzes the fault and obtains the processor number of the failed real processor and an identification code indicating the contents of the fault to store the attained items as interruption information in a main storage and then causes an interruption therein or in another normal real processor.

The interrupted processor analyzes the fault according to the interruption information and stores a guest interruption code in a control information area of the virtual machine in the logical partition resource assigned with the fault real processor, the code indicating a guest interruption of the guest operating system of the pertinent logical partition resource.

After the fault of the failed real processor is recovered, when the operation mode is changed from the host OS mode to the guest OS mode of the partition resource in the recovered real processor, the guest operating system detects the guest interruption code related to the guest operating system and then carries out an interruption recovery process according to the information in the virtual machine save area in association with the occurrence of interruption.

After the interruption recovery, the guest operating system restarts execution of the virtual machine in the logical partition resource which is in an execution wait state and which is assigned with the failed real processor.

Thanks to the means above, in a virtual machine system operating in a multi-processor configuration, it is possible to recover failures in real processors and virtual machines at an occurrence of a permanent fault in a real processor.

Moreover, a virtual machine having a high significance level can be restored without lowering the processing performance thereof.

Additionally, using the real processor utilization ratios thereof at recovery of virtual machines, it is possible to recover a plurality of virtual machines at the same importance level without altering the processor configuration.

Furthermore, in a logical partition resource system in which a plurality of logical partition resources or machines operate in a multi-processor configuration, a virtual processor in a logical partition machine assigned with the failed real processor can be restored from the interrupted state by the guest operating system of the logical partition resource.

In addition, when the failed real processor is restored through replacement of the processor, resetting of the processor state, or the like, it is possible to recover processing of virtual processors of logical partition resources forcibly set to a wait state due to the real processor fault.

BRIEF DESCRIPTION OF THE DRAWINGS

These and other objects and advantages of the present invention will become apparent by reference to the following description and accompanying drawings wherein:

FIGS. 5A and 5B are flowcharts showing operation of an internal information save circuit of the real processor;

FIG. 6 is a flowchart showing operation of a fault recovery circuit of an internal control or service processor;

FIG. 7 is a flowchart showing operation of recovery of an interrupted virtual processor in an interrupted guest recovery of a host operating system;

FIG. 9 is a diagram showing allocation of real processors to virtual machines in a failure recovery state according to the first embodiment;

FIG. 10 is a diagram showing allocation of real processors to virtual machines and recovery attributes in a normal state according to a second embodiment;

FIG. 12 is a diagram showing allocation of real processors to virtual machines and recovery attributes in a failure recovery state according to the second embodiment;

FIG. 15 is a diagram showing allocation of real processors to virtual machines in a normal state according to the third embodiment;

FIG. 17 is a flowchart showing operation of a normal real processor interrupted due to a permanent failure in the third embodiment;

FIG. 20 is a flowchart showing operations of host and guest operating systems at replacement of a failed real processor.

DESCRIPTION OF THE PREFERRED EMBODIMENTS

Description will be now given in detail of an embodiment according to the present invention by referring to the accompanying drawings. With reference to FIGS. 1 to 9, a first embodiment of the virtual machine system will be described in accordance with the present invention.

Figure 1:
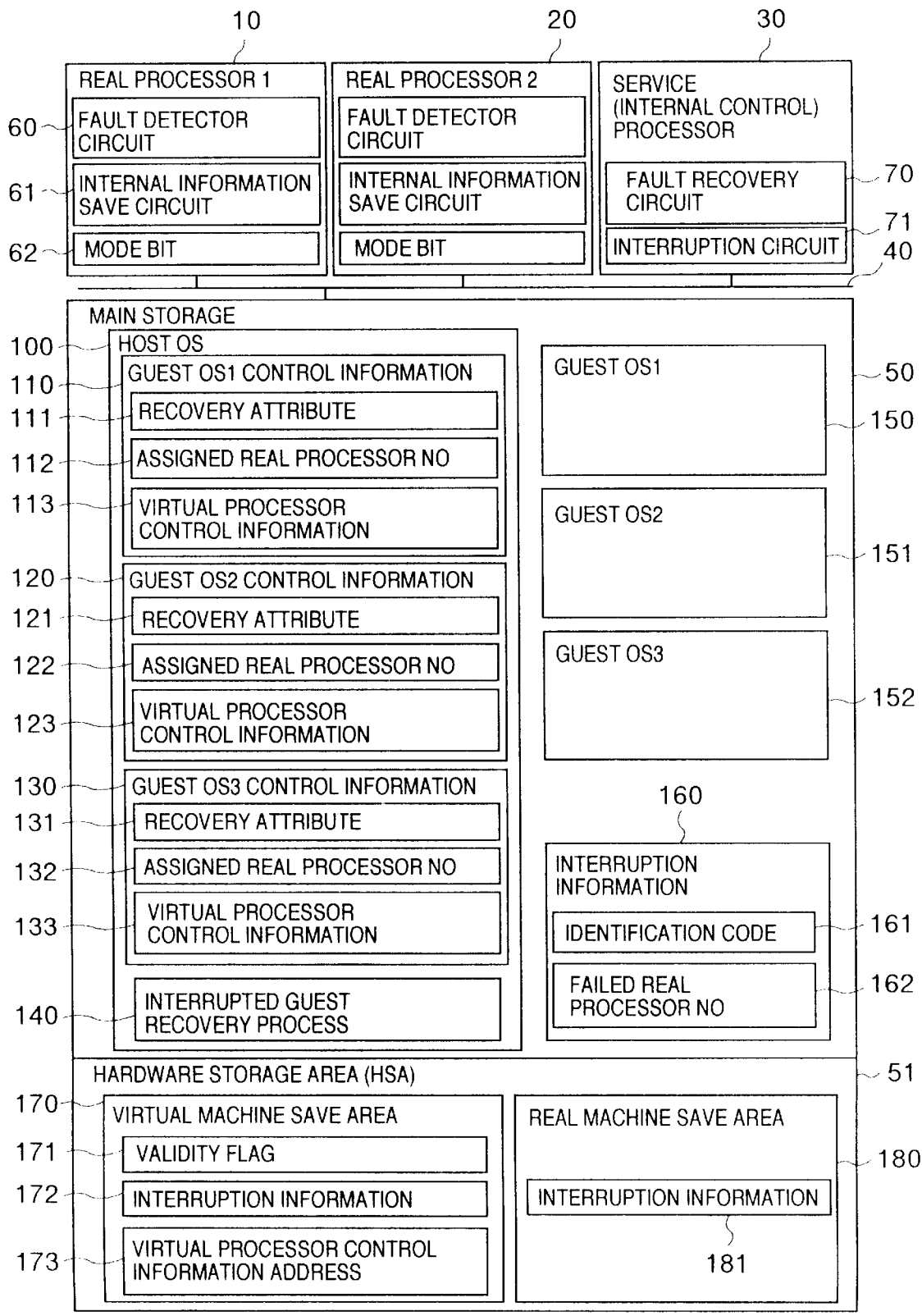
FIG. 1 is a diagram schematically showing the configuration of an embodiment of the virtual machine system according to the present invention.

FIG. 1 shows the configuration of the first embodiment of a virtual machine system including a plurality of virtual machines to be operated on a multiprocessor computer in which virtual machines interrupted due to a permanent failure of a real processor are recovered by a host operating system.

In FIG. 1, a reference numeral 1 indicates a real processor 1, a numeral 20 denotes a real processor 2, a numeral 30 stands for a service processor to control computer internal operations, a numeral 50 designates a main storage shared by the processors, a numeral 51 represents a hardware storage area (HSA) for the processors, a numeral 40 indicates an internal bus to establish connections between the processors, service processors, main storage, and the hardware storage area.

Although the embodiment includes the service processor 30, the function of the processor 30 may be provided in the real processors 1 and 2 without using the processor 30.

A numeral 60 denotes a fault detector circuit in real processor 1, a numeral 61 represents an internal information saving circuit in processor 1, a numeral 62 designates a mode bit-field disposed in real processor 1 to indicate a real machine mode of operation of a real processor and a virtual machine mode of operation of a virtual machine on the real processor.

In the service processor 30, a numeral 70 denotes a fault recovery circuit and a numeral 71 indicates an interruption circuit to generate an interruption signal to the real processor.

In the main storage 50, a numeral 100 stands for a host OS storage area and numerals 110, 120, and 130 respectively designate control information for guest operating systems 1 to 3.

The control information of the respective operating systems includes recovery attributes 111, 121, and 131, assigned real processor numbers 112, 122, and 132, and virtual processor control information 113, 123, and 133, respectively. Operating systems 1 to 3 each have a single-processor configuration.

A numeral 140 indicates a process of the host operating system to recover an interrupted guest.

Moreover, numerals 150 to 152 respectively denote main storages respectively of guest operating systems 1 to 3, a numeral 160 represents an interruption information area, a numeral 161 designates an identification code storage area to indicate the contents of interruption (e.g., processor, memory, or input/output interruption), and a numeral 162 denotes a processor number storage area.

A numeral 170 stands for a virtual machine save area to store therein state information of virtual machines saved in the hardware storage area 51 at occurrence of a fault, a numeral 171 indicates a validity flag to indicate a state of validity of the storage area 170, a numeral 172 represents an area to store therein information at interruption of a virtual processor, and a numeral 173 designates an area to store therein an address of control information for the interrupted virtual processor.

In addition, a numeral 180 of the hardware storage area 51 indicates a real machine save area to store therein status information of a real processor at occurrence of a fault.

According to the embodiment, to recover virtual machines interrupted due to a permanent fault occurred in a real processor, there is provided the following feature. Namely, when assigning each virtual processor to either one of the plural real processors (step 500), guest OS recovery attributes 111, 121, and 131 designating importance or significance of jobs of the respective virtual machines are first specified (step 502) and then the virtual machines are initiated to conduct its operation (step 504) as shown in FIGS. 1 and 5A.

According to another feature of the embodiment, the mode bit 62 is checked, as shown in FIGS. 5B and 6, at an occurrence of a permanent failure in a real processor to determine that a real or virtual machine is running at the failure so as to save the virtual and real machine states in the virtual and real machine save areas 170 and 180, respectively.

Figure 2:
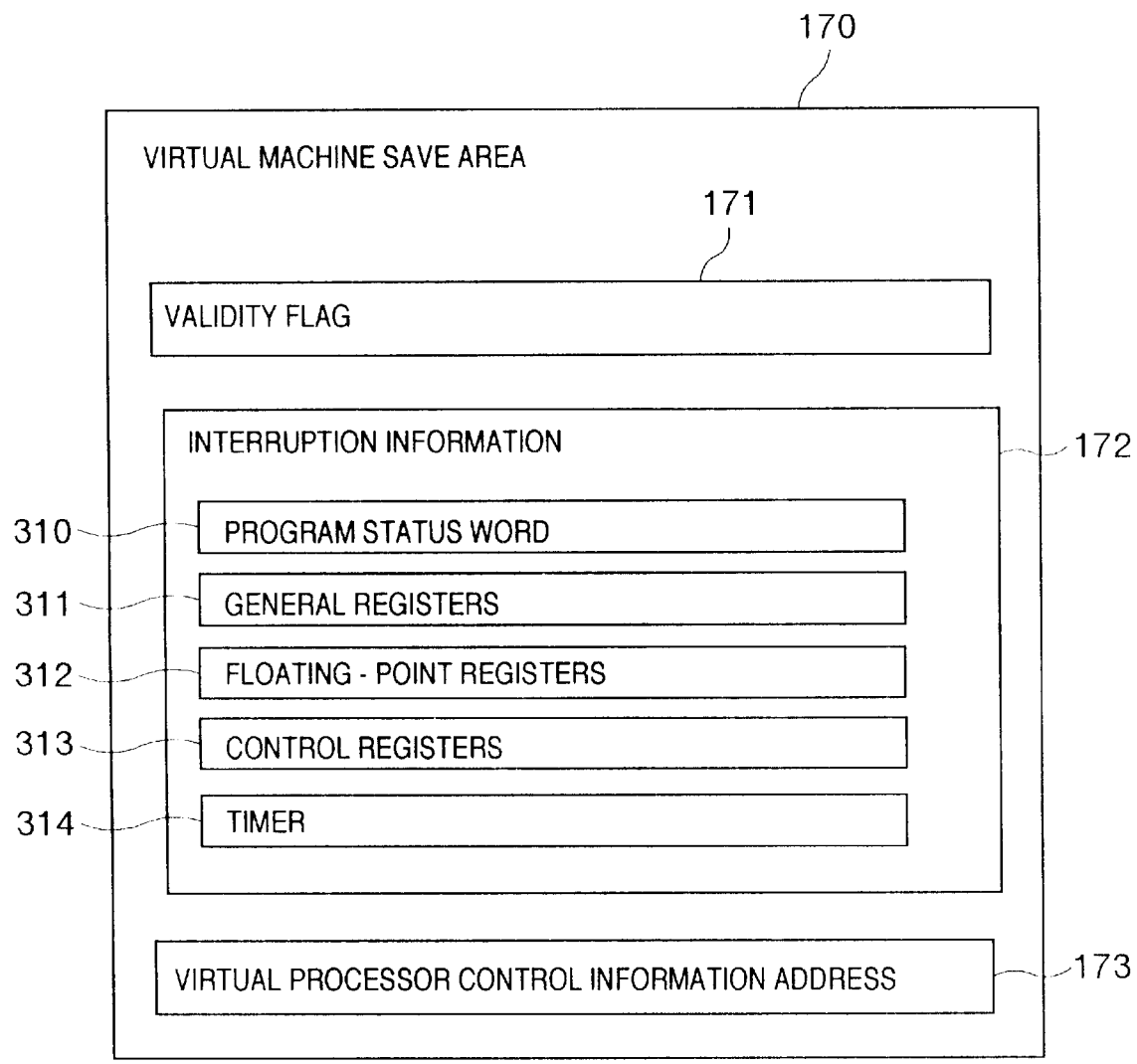
FIG. 2 is a diagram showing a virtual machine save area.

FIG. 2 shows the virtual machine save area 170 to store therein a state of a virtual processor operating at occurrence of a permanent fault in a real processor. In this connection, the information saving operation and fault recovery are unnecessary for a temporary failure in ordinary cases. Specifically, a system having detected the failure invokes a test to check the failure. As a result of the check, when it is decided that the failure possibly occurs repeatedly, the operations above are carried out. In the interruption information field 172, there are saved a program status word 310, contents of general registers 311, contents of floating-point registers 312, contents of control registers 313, and a timer value 314.

Figures 3, 4:
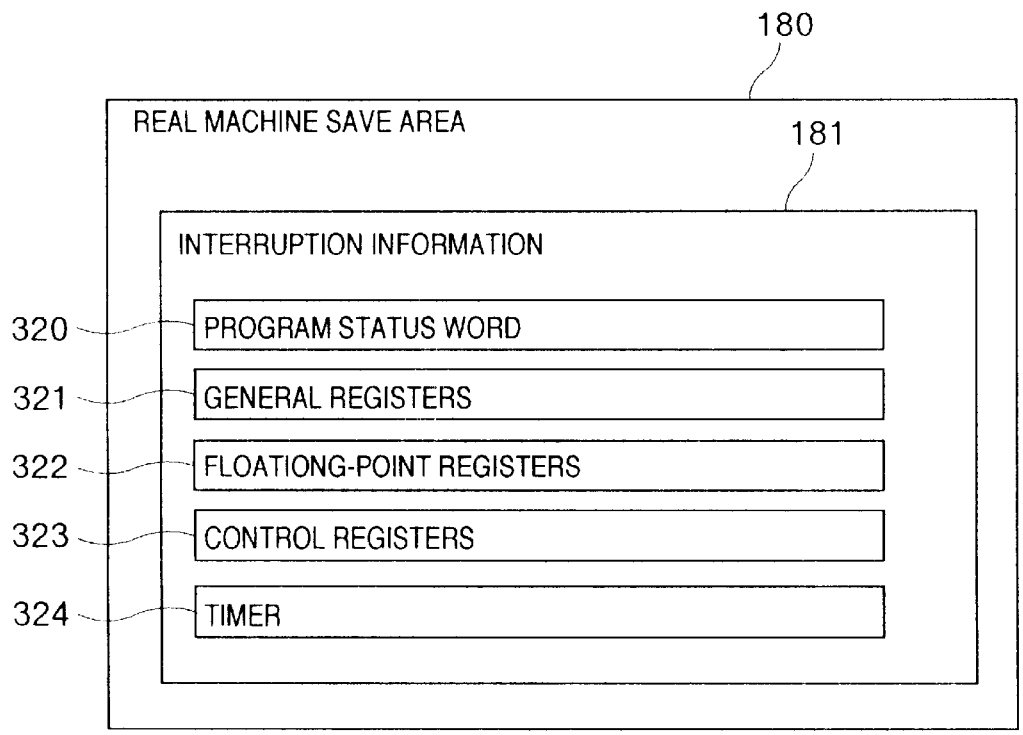
FIG. 3 is a diagram showing a real machine save area.
FIG. 4 is a diagram for explaining allocation of real processors to virtual machines in a normal state of the first embodiment.

FIG. 3 shows the real machine save area 180 to store therein a state of a real machine running at occurrence of a permanent failure in a real processor. Stored in the interruption information field 181 are a program status word 320, contents of general registers 321, contents of floating-point registers 322, contents of control registers 323, and a timer value 324.

FIG. 4 is a table 330 showing the configuration of virtual machines, examples of recovery attributes set in the control information of the respective guest operating systems, and examples of read processor numbers assigned to the respective operating systems. Guest operating system 1 has an important guest attribute and guest operating systems 2 and 3 each have an ordinary guest attribute. Guest operating system 1 is assigned with real processor 1 and guest operating systems 2 and 3 each are assigned with real processor 2.

Subsequently, description will be given of a method of recovering a logic partition system and/or a virtual machine system when a permanent or fixed fault takes place in real processor 1.

Referring to FIG. 5B, operation of the internal information saving circuit 61 of real processor 1 will be described.

The circuit 61 decides that the fault of the real processor 1 detected by the fault detector circuit 60 is a permanent fault (step 400).

To guarantee the contents of execution of the interrupted instruction, the circuit 61 stops the instruction execution microprogram of real processor 1 (step 401).

The circuit 61 reports detection of the permanent fault to the service processor 30 (step 402).

Before saving internal information, the internal information saving circuit 61 checks the mode bit 62 to decide whether or not a virtual machine is running on real processor 1 (step 403).

When such a virtual machine is present, the circuit 61 saves interruption information of the virtual processor in the virtual machine save area 170 (step 404).

The circuit 61 saves the control information address of the interrupted processor in the save area 170 (step 405).

After completely saving information items in the interruption information field 172 and control information address field 173, the circuit 61 sets the validity flag 171 in the save area 170 (step 406).

When the state of the virtual machine is thus saved, the circuit 61 changes the operation mode to the real machine mode to save execution information of the real machine (step 407).

As a result of the preceding check of the mode bit 62 in step 403, when it is detected that a real machine is running on real processor 1, i.e., a virtual machine control program as a portion of the host operating system is running thereon, the circuit 61 sets an invalidity flag indicating invalidity of the area 170 to the validity flag field 171 of the virtual machine save area 170 (step 408).

After finishing step 407 or 408, the circuit 61 saves interruption information of the real processor in the real machine save area 180 (step 409). The circuit 61 then sets real processor 1 to a check stop state (step 410). In step 402, in place of the operation to report the permanent fault from real processor 1 to the service or internal control processor 30, there may be conducted an operation in which the permanent fault is notified to the plural real processors 20, 30, etc. each having a fault recovery circuit and an interruption circuit.

Referring now to FIG. 6, description will be given of operation of the fault recovery circuit 70 in the service processor 30 (or, one of the plural real processors 20, 30, etc.) having received the report of the permanent fault in real processor 1.

The fault recovery circuit 70 receives a report of the permanent fault from failed real processor 1 (step 430) and then analyzes the fault (step 431) to decide whether or not internal information has been completely saved by real processor 1 (step 432).

When the internal information saving operation fails, the recovery circuit 70 conducts by a normal real processor the subsequent steps 434 to 440 to thereby save the internal information.

The circuit 70 examines the mode bit 62 to determine whether or not a virtual machine is operating on real processor 1 (step 434).

When such a virtual machine is present, the circuit 70 saves interruption information of the virtual processor in the virtual machine save area 170 (step 435).

The circuit 70 saves the control information address of the interrupted virtual processor in the save area 170 (step 436).

After completely saving information items in the interruption information field 172 and control information address field 173, the circuit 70 sets the validity flag 171 in the save area 170 (step 437).

When the state of the virtual machine is saved as above, the circuit 70 changes the operation mode to the real machine mode to save execution information of the real machine (step 438).

As a result of the check of the mode bit 62 in step 434, when it is determined that a real machine is operating on real processor 1, the circuit 70 sets an invalidity flag indicating invalidity of the area 170 to the validity flag field 171 of the virtual machine save area 170 (step 439).

After completing step 438 or 439, circuit 61 saves interruption information of the real processor in the real machine save area 180 (step 440).

When step 432 results in "success" or when step 440 is completed, the circuit 70 checks to determine whether or not the failed processor is in the check stop state (step 441).

When the processor is in other than the check stop state, the circuit 70 sets the failed real processor to the check stop state (step 442).

When the processor is in the check stop state, the circuit 70 stores the fault identification code and failed real processor number in the interruption information field 160 for the processor failure (step 443).

Thereafter, the circuit 70 activates the interruption circuit 71 to cause a processor fault interruption in the host operating system running on a normal processor (step 444).

In response to the interruption, the recovery process 140 of the host operation system starts its operation to recover the interrupted guest, namely, to restore the interrupted state, which will be described in the following paragraphs.

Figure 8:
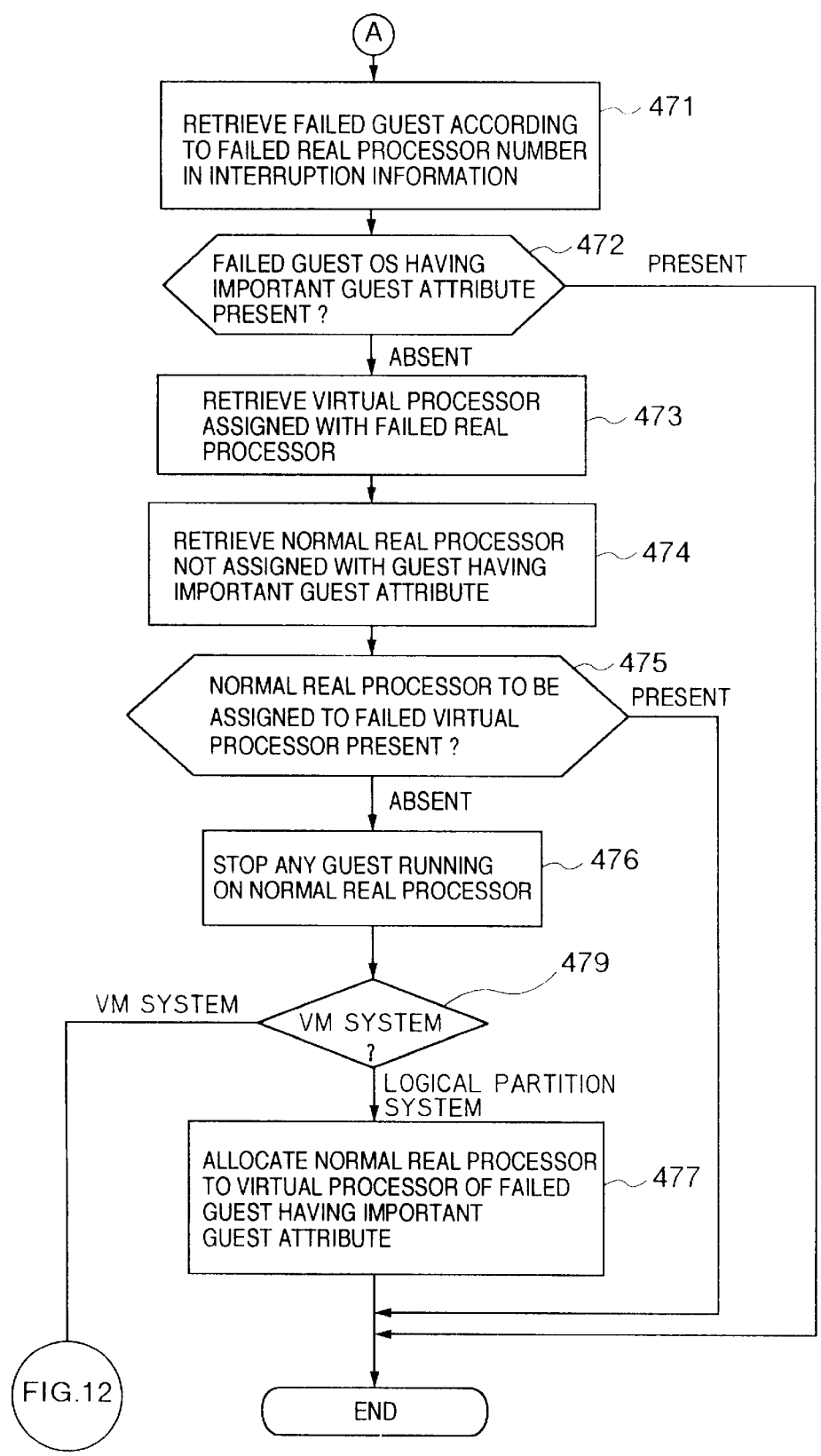
FIG. 8 is a flowchart showing operation of recovery of important virtual processors in the interrupted guest recovery of a host operating system.

Referring now to FIGS. 7 and 8, description will be given of operation of the interrupted guest recovery process 140 in the host operating system, the process 140 being initiated by a processor fault interruption.

On detecting the processor fault interruption, the process 140 stops guest operating systems running on normal processors and then starts operation of a virtual machine control program of the host operating system (step 460). Thereafter, the process 140 accepts the fault interruption (step 461).

The process 140 writes interruption information 181 of the real machine save area 180 in an accessible main storage (step 462).

According to the interruption information 181, the process 140 recovers the real machine operation (step 463).

The process 140 checks the validation flag 171 of the virtual machine save area 170 (step 464).

When the validation flag 171 is valid, the process 140 reads the control information address 173 of the failed virtual processor in a main storage area available for the host operating system (step 465).

The process 140 then writes interruption information of the save area 170 in the accessible main storage area (step 466).

According to the saved interruption information, the process 140 decides whether or not the interrupted process of the virtual processor is recoverable (step 467).

When the process is recoverable, the process 140 carries out a recovery operation of the interrupted process according to the interruption information (step 468).

The process 140 then reflects the restored process in the contents of the control information address of the failed virtual processor (step 469). Namely, the process 140 updates the contents of the address.

When it is decided that the interrupted process cannot be recovered in step 467, the process 140 reports the failure of the virtual processor to the host and guest operating systems (step 470).

When the validity flag 171 is determined to be invalid in the check of step 464 or when the operation of step 469 or 470 is completely finished, the process 140 in the logical partition system retrieves a failed guest according to the failed real processor number 162 of the interruption information 160 (step 471). In the virtual machine system, however, the process 140 conducts the above operation in step 510 and subsequent steps of FIG. 12.

The process 140 checks whether or not there exists a failed guest operating system having the important guest attribute (step 472).

When such a guest operating system is present, the process 140 searches for a virtual processor assigned with the failed real processor (step 473). When such an operating system is absent, the process 140 terminates its operation.

The process 140 searches for a normal real processor not allocated to a guest having the important guest attribute (step 474).

The process 140 determines whether or not there exists a normal real processor allocatable to the failed virtual processor (step 475).

When such a real processor is present and there exists a guest running thereon, the process 140 stops operation of the guest (step 476). When such a real processor is absent, the process 140 terminates the recovery process.

After completing step 176, the process 140 sets the guest operating system having the ordinary guest attribute to a stop state and then assigns a normal real processor to a virtual processor of the failed guest having the important guest attribute (step 477).

FIG. 9 is a table 480 showing the virtual machine system configuration recovered by the control operation, recovery attributes in the control information of the respective guest operating systems, and real processor numbers respectively thereof. Guest operating system 1 has the important guest attribute and hence is recovered by real processor 2 to continuously achieve operation. Guest operating systems 2 and 3 each possess the ordinary guest attribute and are therefore set to the stop state.

After the permanent fault is removed from the real processor by such a technology as concurrent maintenance or resetting, a real processor may be assigned to guest operating systems 2 and 3 to change the operation state thereof from the stop state to the operating state. In this situation, since these operating systems 2 and 3 do not recognize the stop state of the real processor, it seems to the operating systems 2 and 3 as if the operations thereof are continuously achieved.

According to the embodiment described above, in a virtual machine system operating on a multi-processor computer, there can be provided a fault recovery method in which even when a permanent fault occurs in a real processor, the operation can be successively executed without decreasing the processing performance of virtual machines of which processing efficiency is required to be retained, thereby avoiding the system down. Description will next be given of a virtual machine recovery method in which real processor utilization ratios at virtual machine recovery are set to recovery attributes.

Figure 11:
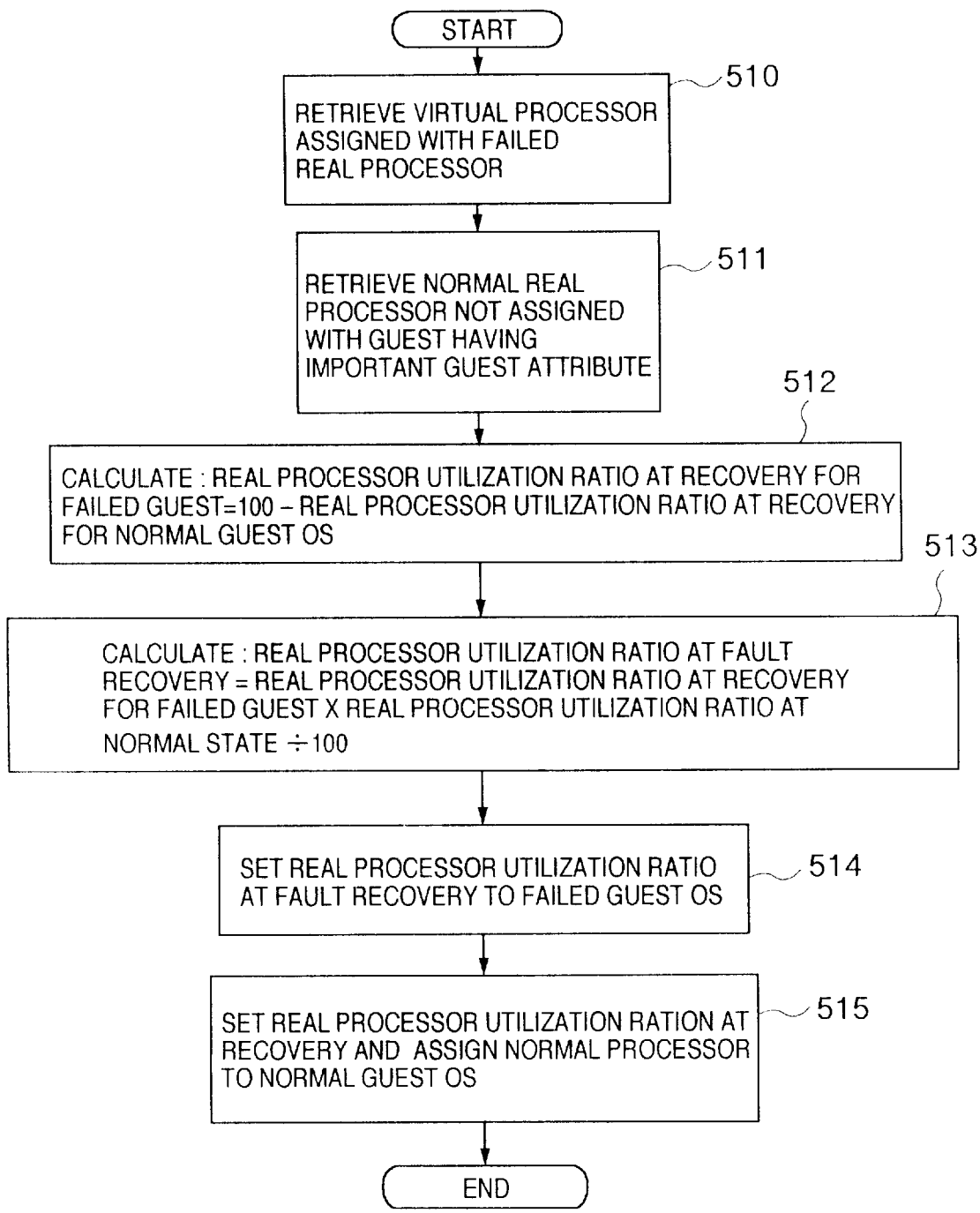
FIG. 11 is a flowchart showing operation of recovery of ordinary virtual machines in the interrupted guest recovery processing of the host operating system.

Referring now to FIGS. 10 to 12, description will be given of a second embodiment of the present invention.

FIG. 10 is a table 500 showing the construction of a virtual machine system of the second embodiment, recovery attributes respectively set in control information of guest operating systems, real processor numbers allocated to the guest operating systems, and real processor utilization ratios.

The recovery attributes include an importance attribute to identify necessity to retain the performance of the pertinent virtual machine. Moreover, the attributes include a real processor utilization ratio at virtual processor recovery. When a normal real processor associated with the pertinent guest operating system is to be assigned to a failed virtual machine, the operating system reserves utilization of the normal real processor according to the utilization ratio. Specifically, when a plurality of virtual processors operate on one real processor, the total execution time thereof are allocated o the respective virtual processors according to the utilization ratios. The operation period of time is actually decided by the host operating system. Guest operating systems 1 to 3 each have the ordinary guest attribute in usual cases.

Real processor 1 is assigned to guest operating systems 1 and 2, whereas real processor 2 is allocated to guest operating system 3. Guest operating systems 1 to 3 respectively operate with real processor ratios of 90%, 10%, and 100%, respectively.

When a failure occurs in real processor 1, guest operating system 1 to operate on another real processor has a real processor utilization ratio of 90% for recovery, guest operating system 2 possesses a real processor utilization ratio of 0% for recovery, and guest operating system 3 to operate on another real processor has a real processor utilization ratio of 20% for recovery.

When recovering a failure of the virtual machine system due to occurrence of a permanent fault in real processor 1, the interrupted guest recovery process 140 decides important and ordinary guests (step 479) after step 476. When all guest operating systems each have the ordinary guest attribute, guest operating systems 1 and 2 assigned with real processor 1 are set to the halt state and then the operation of FIG. 11 is started.

FIG. 11 shows in a flowchart the process of appropriately allocating real processor utilization ratios to failed guest operating systems according to the real processor utilization ratios for recovery assigned to guest operating systems. This process is a portion of the interrupted guest recovery process 140 and is employed in place of the process of FIG. 8 in which the importance and non-importance (ordinariness) are used as recovery attributes.

The process 140 searches for a virtual processor assigned with the failed real processor (step 510).

The process 140 searches for a normal real processor not assigned to a guest having the important guest attribute (step 511).

Assuming the real processor utilization ratio assigned to all failed guests to be those for recovery for the failed guests, the process 140 obtains the real processor utilization ratios for recovery for the failed guests. Namely, the process 140 subtracts the real processor utilization ratio for recovery of the normal guest operating systems from 100 (step 512).

Assuming the real processor utilization ratio assigned to each failed guest to be equal to that for fault recovery, the process 140 multiplies the real processor utilization ratio for recovery of the failed guest by the real processor utilization ratio for normal operation and then divides the obtained quotient by 100, thereby calculating the real processor utilization ratio for fault recovery for each failed guest (step 513).

The process 140 sets the obtained ratio for fault recovery to the failed guest operating system (step 514).

The process 140 sets the ratio for recovery to a normal guest operating system in the halt state (step 515).

FIG. 12 is a table 530 showing the constitution of the virtual machine system in which guest operating systems 1 and 2 interrupted due to a permanent fault in processor 1 are recovered by the control operation.

The table 530 includes the configuration of the system, recovery attributes set in control information of the respective guest operating systems, real processor numbers and real processor utilization ratios respectively assigned to the guest operating systems.

After the recovery, real processor 2 is allocated to guest operating systems 1 to 3.

Guest operating system 3 operates with a real processor utilization ratio of 20%, which is equal to the real processor utilization ratio for recovery.

Since guest operating systems 1 and 2 in the normal state respectively have real processor utilization ratios of 90% and 10%, the real processor utilization ratio 80% for recovery of failed guests are accordingly distributed thereto such that guest operating systems 1 and 2 operate with real processor utilization ratios of 72% and 8%, respectively.

Since each guest operating system does not recognize the stop state of the real processor, it seems to the guest operating system that the operation is continuously executed.

In this regard, assume that the recovery operation is conducted for a virtual machine which has the ordinary attributes in the system environment using the importance and non-importance (ordinariness) attributes and which is assigned with a real processor related to a permanent fault. In this situation, it may also be possible to execute the process of FIG. 11 when the normal real processor utilization ratio of each virtual machine is set as a recovery attribute, the virtual machine assigned with the failed real processor has the ordinariness attribute, and the normal real processor has the ordinariness attribute.

As above, according to the embodiment, there is provided a recovery method for use in a virtual machine system operating on one multi-processor computer in which even when a permanent fault occurs in a real processor, the operation of the system can be continuously executed without causing the system down.

Subsequently, a third embodiment of the present invention will be described.

Figure 13:
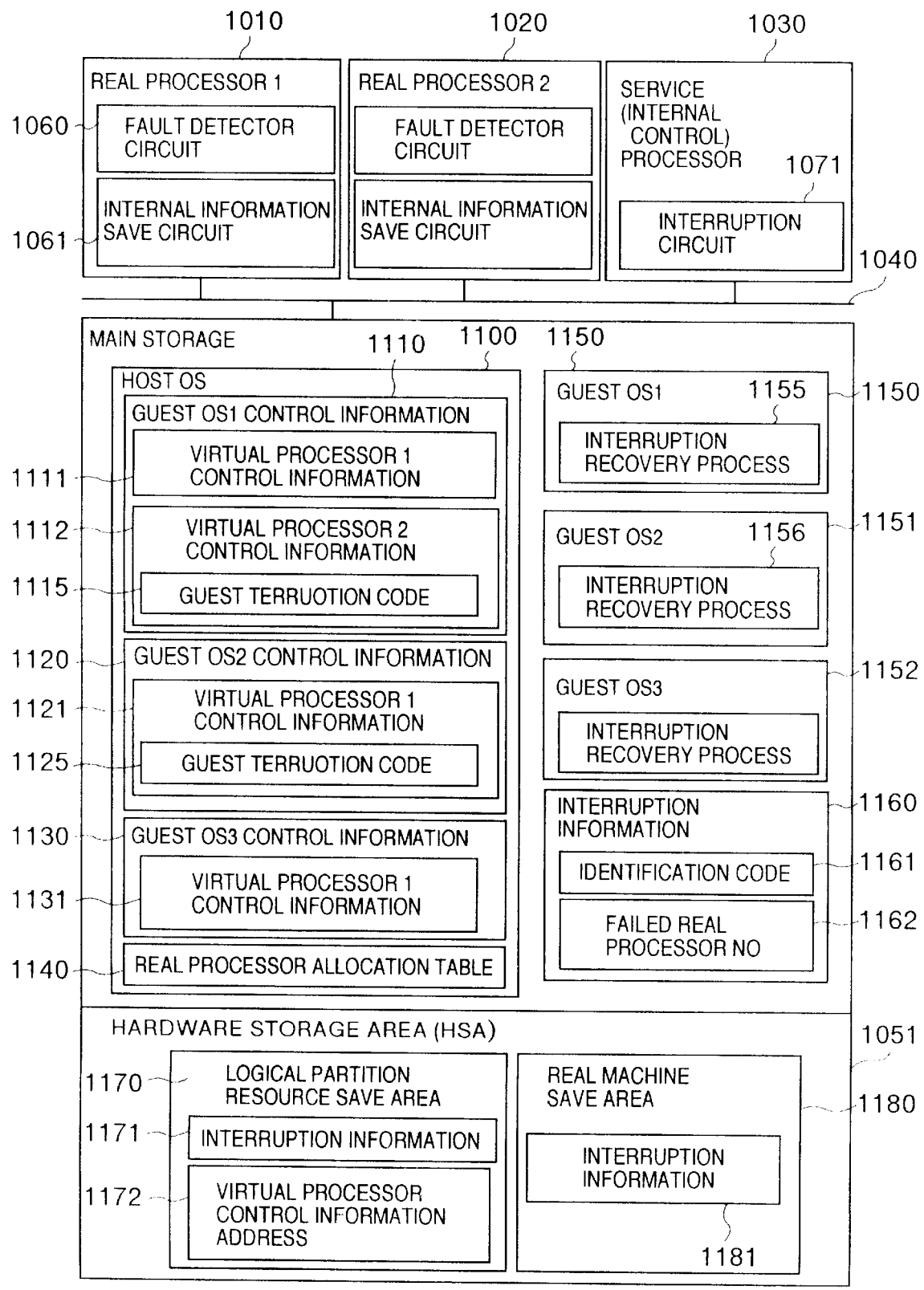
FIG. 13 is a diagram schematically showing the configuration of a third embodiment of the virtual machine system according to the present invention.

FIG. 13 shows the configuration of a logical partition resource system as the third embodiment in which a plurality of logical partition resources or machines operate on a multi-processor configuration. In the system, a logical partition resource interrupted due to a permanent fault in a real processor is recovered by a guest operating system of another real processor.

In FIG. 13, a reference numeral 1010 indicates real processor 1, a numeral 1020 denotes real processor 2, a numeral 1030 stands for an internal control or service processor, a numeral 1050 represents a main storage, a numeral 1051 designates a hardware storage area (HSA), and a numeral 1040 indicates an internal bus to establish connections between the processors 1010 and 1020, service processor 1030, main storage 1050, and hardware storage area 1051.

Although the embodiment includes the service processor 1030, the function of the processor 1030 may be allocated to real processors 1 and 2 without using the processor 1030.

In real processor 1, a numeral 1060 denotes a fault detector circuit and a numeral 1061 stands for an internal information save circuit. A numeral 1071 indicates an interruption circuit to produce an interruption signal to the processors 1 and 2.

In the main storage 1050, a numeral 1100 denotes a host OS control area and numerals 1110, 1120, and 1130 respectively represent control information respectively of guest operating systems 1 to 3. Included in the guest OS control information are virtual processor control information items 1111, 1112, 1121, and 1131.

The virtual processor 2 control information 1112 includes a guest interruption code 1115, whereas the virtual processor 1 control information 1121 includes a guest interruption code 1125.

Although not shown in FIG. 13, the guest interruption code is provided in any other virtual processor control information.

A numeral 1140 stands for a real processor allocation table in the host operating system. Numerals 1150 to 1152 indicate main storage areas of respective guest operating systems 1 to 3 in the main storage 1050, and numerals 1155 and 1156 respectively denote interruption recovery processes included in guest operating systems 1 and 2, respectively. An interruption recovery process is also included in any other guest operating systems. The third embodiment is clearly different from the second embodiment in which the interrupted guest recovery process is included in the host operating system.

A numeral 1160 indicates an interruption information area, a numeral 1161 denotes an identification code storage area to specifically indicate the interruption (e.g., processor, memory, or I/O interruption), and a numeral 1162 represents an area to store therein a failed real processor number.

In the hardware storage area 51, a numeral 1170 denotes a logical partition resource save area, a numeral 1171 is an area disposed in the area 1170 to store therein interruption information, and a numeral 1172 stands for a field disposed in the area 1170 to store therein a control information address of an interrupted virtual processor.

In the hardware storage area 51, a numeral 1180 indicates a real machine save area and a numeral 1181 designates an area disposed in the area 1180 to store therein real processor interruption information.

According to the embodiment, to restore logical partition resources interrupted due to a permanent fault in a real processor, the interruption recovery processes 1155, 1156, etc. are provided in the respective operating systems of the logical partition resources, respectively. With this provision, it is possible to recover the interrupted processes on the virtual processors in the multi-processor computer such that the virtual processors in the fault state are separated from the system to restore the logical partition resources.

Figure 14:
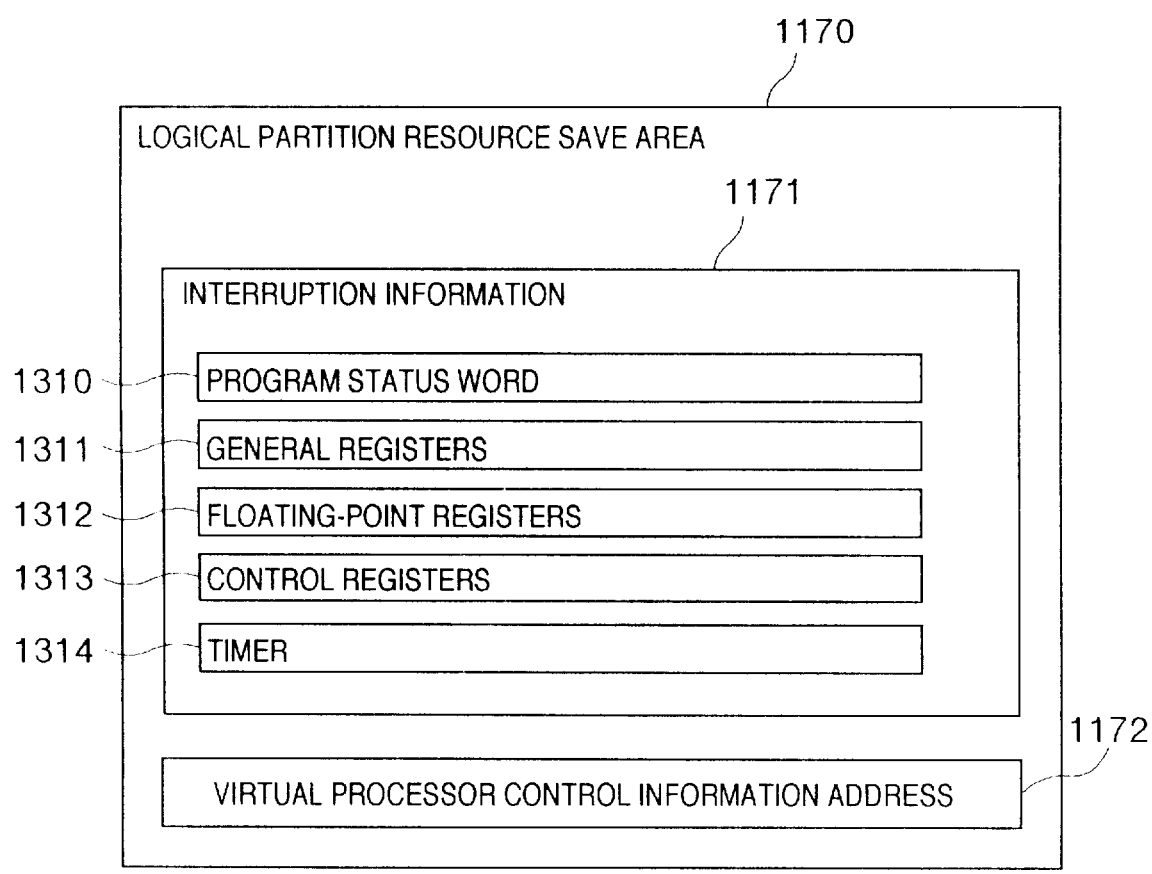
FIG. 14 is a diagram showing a logical partition resource save area.

FIG. 14 shows the logical partition resource save area 1170 to save therein a state of a process running at occurrence of a permanent fault in a real processor. In the information field 1171 of the area 1170, there are saved a program status word 1310, the contents of general registers 1311, the contents of floating-point registers 1312, the contents of control registers 1313, and a timer value 1314. Saved in the address area 1172 is an address of virtual processor control information.

FIG. 15 indicates the real processor allocation table 1140, i.e., a table 1400 for explaining the virtual processor configuration of logical partition resources and connections between virtual and real processors of the embodiment. Virtual processor 1 of guest operating system 1 and virtual processor 1 of guest operating system 2 are assigned with real processor 1, whereas virtual processor 2 of guest operating system 1 and virtual processor 1 of guest operating system 3 are assigned with real processor 2. The real processors are respectively connected to the associated virtual processors in the online state (the process objective state of the respective guest operating systems). As can be seen from FIGS. 13 and 15, guest operating system 1 is in the multi-processor configuration.

Description will now be given of operation of restoring the virtual machine system when a permanent fault takes place in real processor 1 shown in FIG. 13.

Figure 16A:
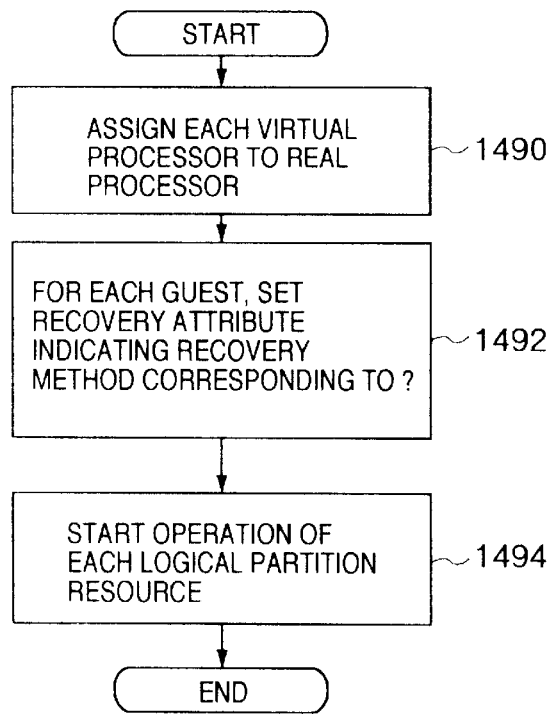
FIGS. 16A and 16B are flowcharts showing operation of an internal information save circuit of the real processor in the third embodiment.
Figure 16B:
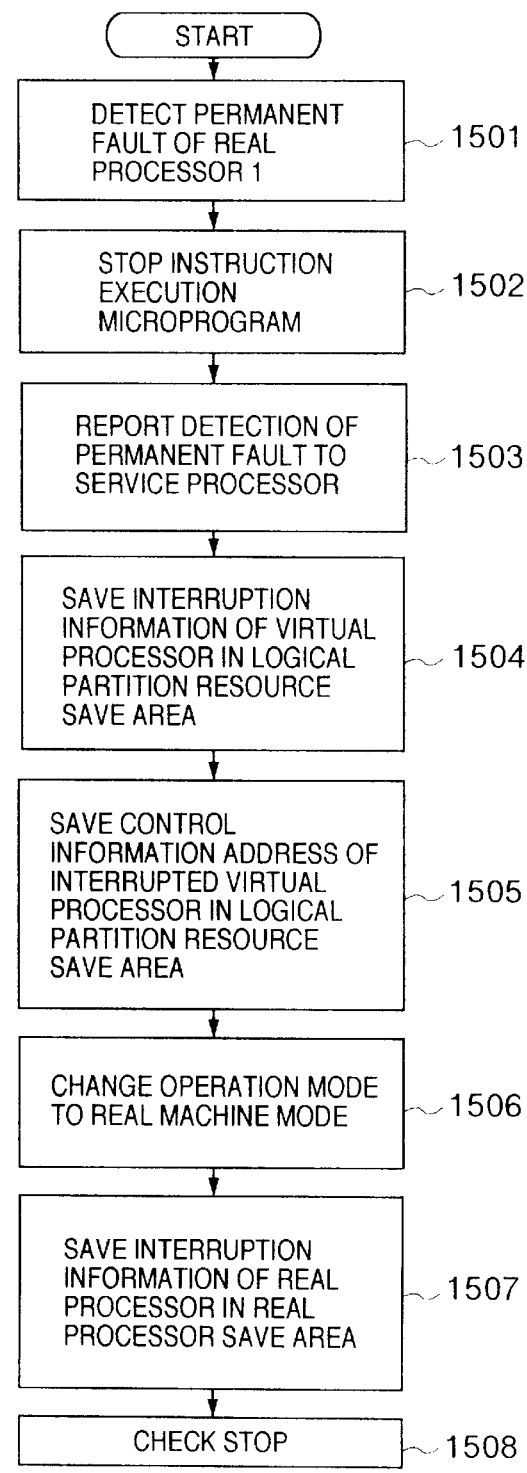

Referring now to FIG. 16, description will be given of operation of the internal information saving circuit 1061 of real processor 1.

The saving circuit 1061 receives the report of the permanent fault of real processor 1 from the fault detector 1060 (step 1501).

To guarantee the contents of interrupted instruction execution, the circuit 1061 stops execution of the instruction execution microprogram of real processor 1 (step 1502).

The circuit 1061 reports detection of the permanent fault to the service processor 1030 (step 1503).

The circuit 1061 saves interruption information of the virtual processor in the logical partition resource save area 1170 (step 1504).

The circuit 1061 saves an address of control information of the interrupted virtual processor in the save area 1170 (step 1505).

After completion of the saving of the virtual processor state, the circuit 1061 alters the operation mode to the real machine mode to save real processor interruption information (step 1506).

The circuit 1061 saves interruption information of the real processor in the real machine save area 1180 (step 1507) and then sets the real machine to the check stop state (step 1508).

On receiving the report of the permanent fault occurrence, the service processor 1030 issues an interruption signal to another real processor 2 and then stores a code indicating the real processor fault and a processor number of processor 1 respectively in the identification code field 1161 and fault real processor number field 1162 of the interruption information area 1160.

Referring next to FIG. 17, description will be given of operation of real processor 2 interrupted due to the permanent fault in real processor 1.

Processor 2 assumes that guest operating system 1 is running thereon (step 1601).

When a plurality of processors are interrupted by the service processor 1030 due to the permanent fault, real processor 2 conducts the internal control operation to change its operation mode from the guest OS mode to the host OS mode. Real processor 2 detects by the host operating system the interruption due to the real processor fault (step 1602).

Real processor 2 analyzes the fault according to the interruption information 1160 (step 1603).

Real processor 2 stores a guest interruption code indicating the guest interruption in the virtual processor 1 control information of guest operating system 1 in the multiprocessor configuration assigned with the fault real processor and in the virtual processor 1 control information of guest operating system 2 in the single processor configuration assigned with the fault real processor (step 1604).

Real processor 2 achieves by the host operating system such guest control operations as simulation of input and output operations for guests (step 1605).

Thereafter, real processor 2 performs an internal control operation to alter the operation mode from the host OS mode to the guest OS mode, which allows guest operating system 3 in the execution wait state to start its operation (step 1606). When the period of processor utilization time allocated to guest operating system 3 is finished or an interruption occurs in the host operating system, real processor 2 achieves an internal control operation to change the operation mode from the guest OS mode to the host OS mode. Real processor 2 conducts by the host operating system such a guest control operation as simulation of input and output operations for guests (step 1607).

Thereafter, real processor 2 carries out an internal control operation to change the operation mode from the host OS mode to the guest OS mode and then guest operating system 1 in the execution wait state starts again its operation (step 1608)

Guest operating system 1 in real processor 2 detects the guest interruption and then there occurs interruption according to the guest interruption code (step 1604) due to the fault in processor 1 (step 1609).

To restore the process being executed on virtual processor 1 of guest operating system 1 of real processor 1 in association with the permanent fault in real processor 1, real processor 2 conducts the interruption recovery process 1155 by guest operating system 1 (step 1610).

After the interruption process is completely finished, processor 2 terminates the host interruption and then restarts execution of guest operating system 1 (step 1611).

Thereafter, when the period of processor utilization time allocated to guest operating system 1 is completed or an interruption occurs in the host operating system, real processor 2 achieves an internal control operation to change the operation mode from the guest OS mode to the host OS mode.

Figure 18:
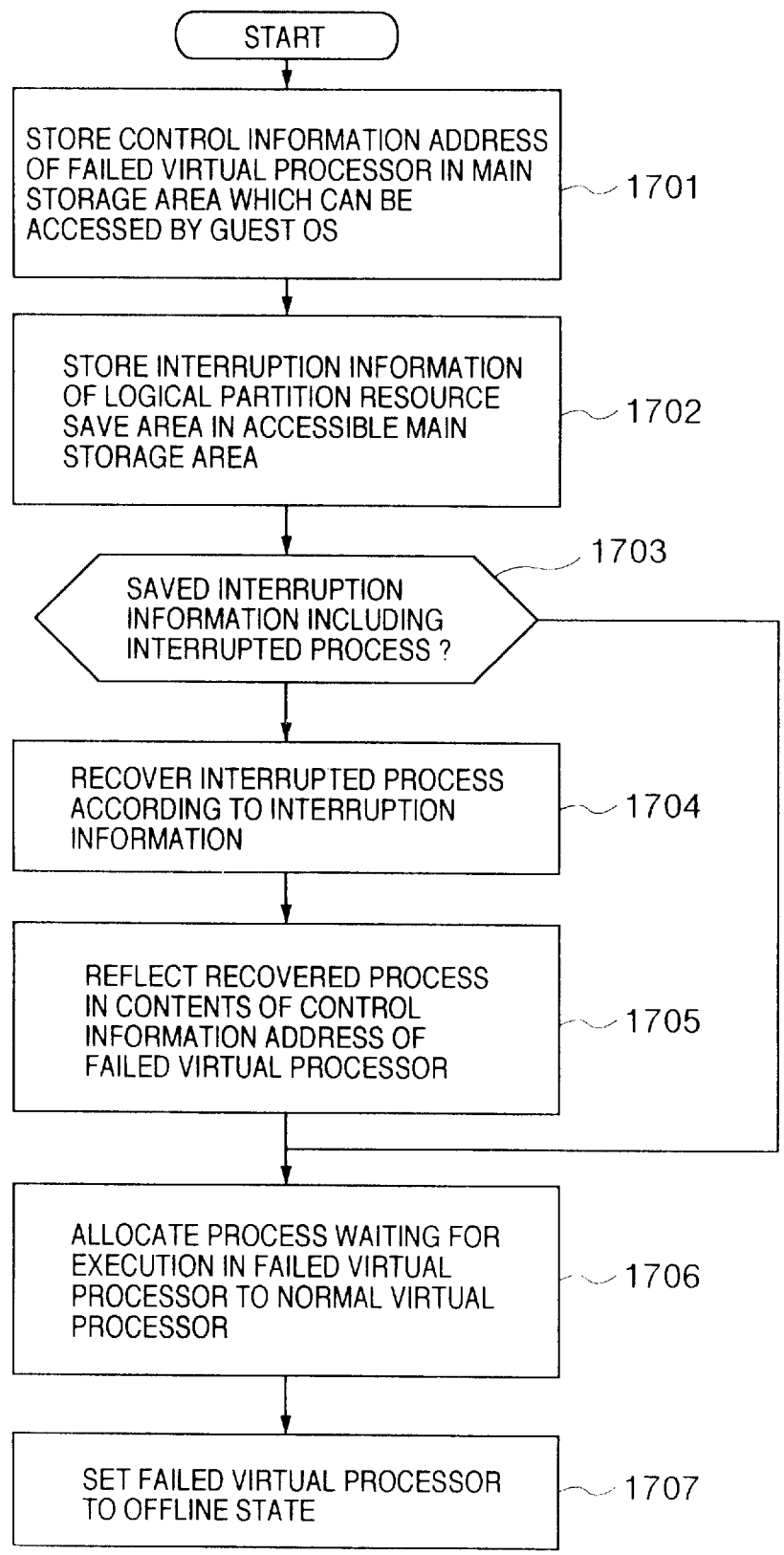
FIG. 18 is a flowchart showing an interruption recovery operation of guest operating system 1.

Referring next to FIG. 18, description will be given of operation of the interruption recovery process 1155 conducted by guest operating system 1 on real processor 2.

The process 1155 reads an address of control information of the fault virtual processor in a main storage area which can be accessed by the guest operating system (step 1701).

The process 1155 reads interruption information of the logical partition resource save area 1170 in an accessible main memory area (step 1702).

The process 1155 decides whether or not the saved interruption information indicates presence of an interruption process (step 1703).

When such an interrupted process is present, the process 1155 recovers the interrupted process according to the interruption information (step 1704) and then reflects the interrupted process thus restored in the contents of the control information address of the failed virtual processor (step 1705). Namely, the process 1155 updates the contents.

When it is decided by step 1703 that such an interrupted process is absent or when step 1705 is completely finished, the process 1155 assigns only a process awaiting execution in the fault virtual processor to a normal virtual processor (step 1706; this case is an exceptional process in the logical partition resource system). When the operation above is finished, the process 1155 sets by guest operating system 1 the fault virtual processor to the offline state (other than the process objective state of the guest operating system) as shown in FIG. 19.

In this regard, there may be conducted a recovery operation of the real machine operation. The recovery operation is the same as that of the first embodiment and hence it is to be understood that description thereof will be unnecessary.

Figure 19:
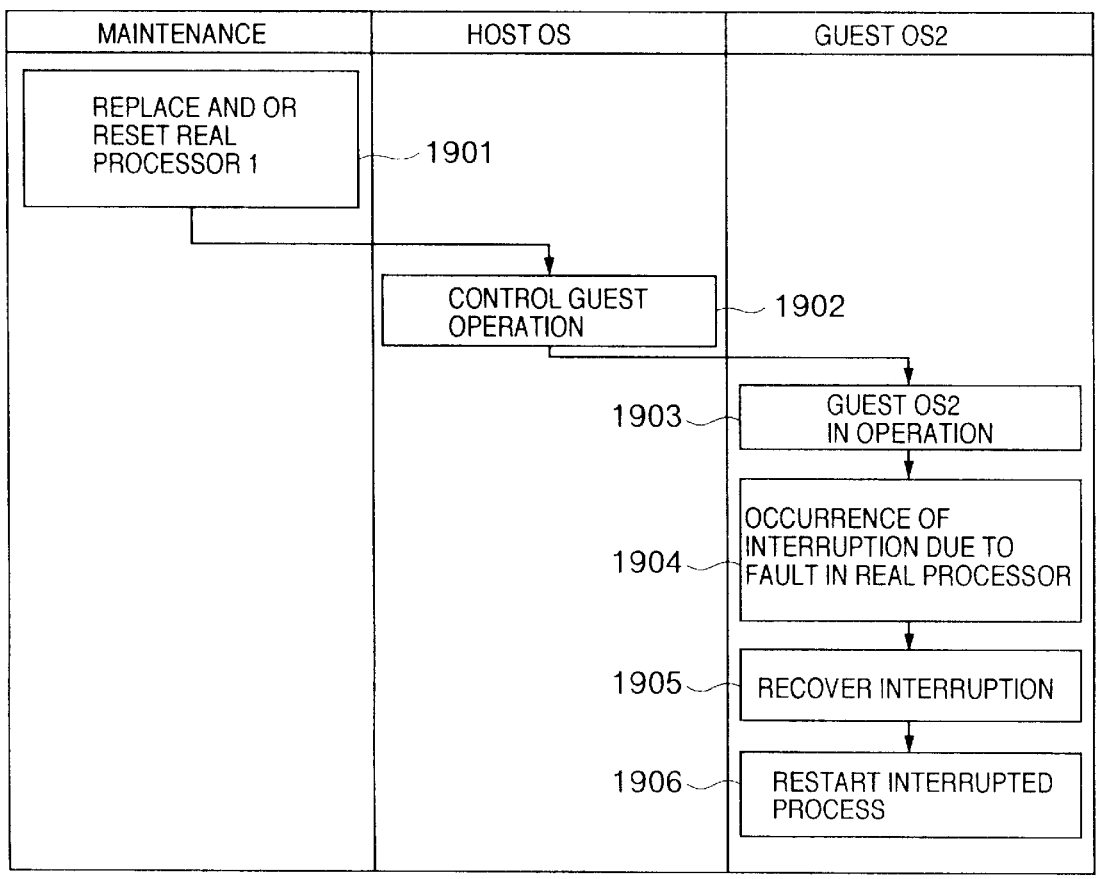
FIG. 19 is a diagram showing allocation of real processors to logical allocation machines after the recovery in the third embodiment.

FIG. 19 is a table 1800 associated with the real processor allocation table 1140 representing the virtual processor constitution of logical partition resources and a state of connections between virtual and real processors when the recovery operation is conducted according to the present invention.

Virtual processor 1 of guest operating system 1 and virtual processor 1 of guest operating system 2 are each assigned with real processor 1, whereas virtual processor 2 of guest operating system 1 and virtual processor 1 of guest operating system 3 are assigned with real processor 2. Virtual processors 1 and 2 of guest operating system are in the offline and online states, respectively. Virtual processor 1 of guest operating system 2 is in the system down state, i.e., in the wait state due to a permanent fault in a real processor. Virtual processor 1 of guest operating system 3 is in the online state. That is, virtual processor 1 of guest operating system 1 and virtual processor 1 of guest operating system 2 are set to the operation halt state. To allow virtual processor 2 of guest operating system 1 to operate without any hindrance, it is desirable that virtual processor 1 of guest operating system 1 is set to the offline state. Even when virtual processor 1 of guest operating system 2 is in the down state, since the guest operating system 2 is not associated with any other virtual processor in this situation, there does not arise any adverse influence and operation of the guest operating system 2 is unnecessary.

Referring now to FIG. 20, description will be given of operations respectively of the host operating system and guest operating system 2 after failed real processor 1 is replaced with a normal real processor.

Fault real processor 1 is replaced and/or reset in the system maintenance (step 1901).

Resultantly, real processor 1 is set to the normal state and the host operating system is operable thereon. The host operating system conducts guest control operations such as simulation of input and output operations for respective guests (step 1902).

Thereafter, according to an internal control operation of real processor 1, the operation mode thereof is changed from host OS mode to the guest OS mode and guest operation system 2 in the execution wait state is initiated to start its operation (step 1903).

Guest operation system 2 senses a guest interruption due to occurrence of the permanent failure in the real processor, resulting in an interruption due to the real processor failure (step 1904).

To recover the process being executed on virtual processor 1 of guest operating system 2 in association with the permanent failure of real processor 1, guest operating system 2 executes the interruption recovery process 1156 shown in FIG. 13 (step 1905).

After the process 1156 is completed, the host interruption process is terminated and guest operating system 2 starts operation thereof (step 1906).

Figure 21:
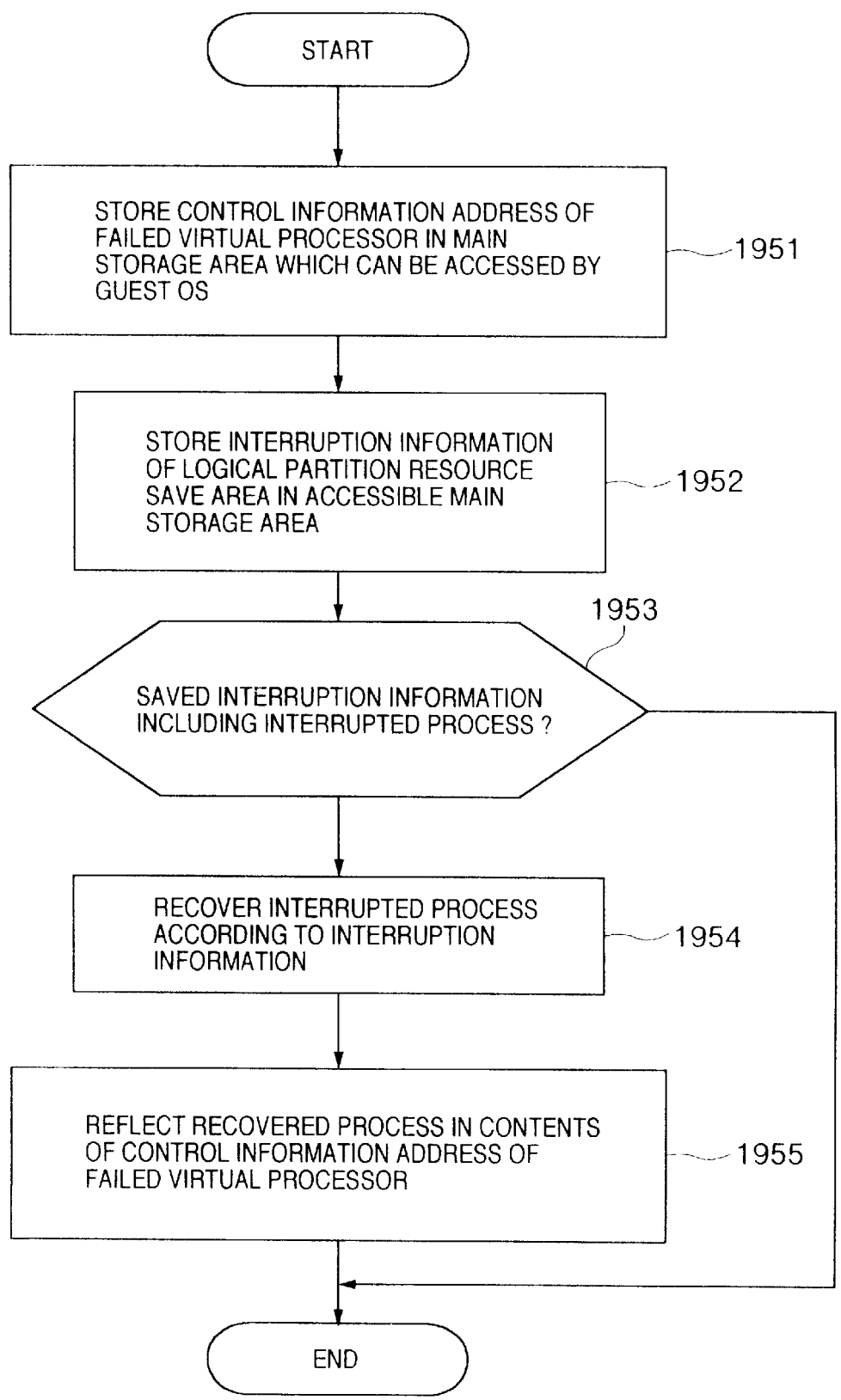
FIG. 21 is a flowchart showing an interruption recovery operation of guest operating system 2 after the replacement of the failed real processor.

Next, operation of the interruption recovery process 1156 by guest operating system 2 will be described by referring to FIG. 21.

The recovery process 1156 reads by guest operating system 2 the control information address of the failed virtual processor in an accessible main storage area (step 1951).

The process 1156 reads interruption information from the logical partition resource save area and stores the information in an accessible main storage area (step 1952).

The process 1156 decides whether or not the saved interruption information includes any interruption process (step 1953).

When such an interruption process is present, the process 1156 recovers the interruption process according to the interruption information (step 1954) such that the interrupted process thus recovered is reflected in the contents of the control information address of the failed virtual processor (step 1955).

When it is determined by step 1953 that such an interruption process is absent or when step 1955 is completely finished, the process 1156 terminates its operation.

In this connection, the state of virtual processor 1 of guest operating system 1 set to the offline state due to the fault is controlled by guest operating system 1, e.g., the state is changed to the online state or is kept unchanged. However, these operations are not directly related to the feature of the embodiment and hence it is to be appreciated that description thereof will be unnecessary.

According to the embodiment described above, there is provided a recovery method for use in the logical partition resource system in which even when a permanent fault occurs in a real processor, the system operation can be continuously executed without stopping operation of logical partition resources.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A fault recovery method, for use in a multi-processor system including a main storage and a plurality of virtual machines which are assigned to a plurality of processors under control of a host operating system and a plurality of guest operating systems and which operate on the processors associated therewith, of detecting a fault occurring in one of the processors and thereby recovering functions of the system, the method comprising the steps of:

setting recovery attributes for failure to each of the virtual machines;

assigning a plurality of virtual machines to a plurality of processors and operating the virtual machines on the processors respectively associated therewith;

storing, at detection of occurrence of a fault in one of the processors, data and status information of virtual machines assigned to said one of the processors and status information of said one of the processors respectively in a virtual machine save area and a real machine save area of the main storage;

storing fault information of said one of the processors in which the fault occurred in the main storage by a fault recovery circuit having received a report of the fault;

restarting an interrupted process and causing an interruption according to the status information of the virtual machines and the status information and fault information of said one of the processors in which the fault occurred, the information being obtained from the main storage; and retrieving, when the interruption is received, one of the virtual machines assigned to said one of the processors in which the fault occurred according to the processor status information in the real machine save area and then assigning the plural virtual machines to the plural processors for operation thereof according to the recovery attributes for failure set to the retrieved virtual machine.

2. A fault recovery method according to claim 1, wherein the recovery attributes at failure include values related to at least two process levels, the method further including a step of determining, as a result of the retrieval of the virtual machine assigned to said one of the processors in which the fault occurred, a virtual machine having a first attribute value and then arranging contents of the attributes, thereby assigning the virtual machine having the first attribute value to another one of the plural processors other than the one processor in which the fault occurred.

3. A fault recovery method according to claim 2, further including a step of determining, as a result of the retrieval of the virtual machine assigned to said one of the processors in which the fault occurred, a virtual machine having a second attribute value and then arranging contents of the attributes, thereby setting the virtual machine having the second attribute value to an operation halt state.

4. A fault recovery method according to claim 1, further including a step of determining, as a result of the retrieval of the virtual machine assigned to said one of the processors in which the fault occurred, a virtual machine having a second attribute value and then arranging contents of the attributes, thereby setting the virtual machine having the second attribute value to an operation halt state.

5. A a multi-processor system including a main storage and a plurality of virtual machines which are assigned to a plurality of processors under control of a host operating system and a plurality of guest operating systems and which operate on the processors associated therewith in which a fault occurring in one of the processors is detected to recover functions of the system, comprising:

a table to set therein recovery attributes for failure to each of the virtual machines;

circuit means for storing, when one of the plural virtual machines assigned to the plural processors under control of the host operating system and plural guest operating system detects during its operation an event of occurrence of a fault in one of the processors, data and status information of virtual machines assigned to said one of the processors and status information of said one of the processors from the processor respectively in a virtual machine save area and a real machine save area of the main storage;

means for reporting the event of occurrence of the fault to at least one of the plural processors;

means for storing fault information of said one of the processors in the main storage by a fault recovery circuit of one of the processors having received the fault report and causing an interruption in the plural processors other than the processor in which the failure occurred;

means for restarting by one of the interrupted processors an interrupted process of the processor according to the status information of the virtual machines and the status information and fault information of said one of the processors in which the fault occurred obtained from the main storage and causing an interruption in the host operating system; and means for retrieving by the host operating system having received the interruption one of the virtual machines assigned to said one of the processors according to the processor status information in the real machine save area and assigning the plural virtual machines to the plural processors according to the recovery attributes for failure set to the retrieved virtual machine.

6. A multi-processor system according to claim 5, wherein the recovery attributes at failure include values related to at least two process levels, the system further including means for determining, as a result of the retrieval of the virtual machine assigned to said one of the processors in which the failure occurred, a virtual machine having a first attribute value and setting the virtual machine to an operation halt state.

7. A multi-processor system according to claim 6, further including means for determining, as a result of the retrieval of the virtual machine assigned to said one of the processors in which the failure occurred, a virtual machine having a second attribute value and then arranging contents of the attributes, thereby assigning the virtual machine having the second attribute value to one of the plural processors other than the processor in which the failure occurred.

8. A multi-processor system according to claim 7, further including:

means for determining which one of the virtual machines and processors is running when the occurrence of a fault in said one of the processors is detected;

means for setting, when the occurrence of a fault in said one of the processors is detected and when it is determined that a virtual machine was running at the fault occurrence, status information to a flag in the virtual machine save area, the status information including a virtual machine control address and an item indicating validity of the status information; and means for setting, when the occurrence of a fault in said one of the processors is detected and when it is determined that a processor was running at the fault occurrence, status information to a flag in the virtual machine save area, the status information including an item indicating invalidity of the status information.

9. A multi-processor system according to claim 8, wherein the fault recovery circuit of at least one of the processors having received the fault report references the flag and stores, when the invalidity is set to the flag, data and status information of virtual machines assigned to said one of the processors in which the fault occurred and status information of the processor respectively in the virtual machine save area and the real machine save area.

10. A multi-processor system according to claim 7, further including means for arranging the attributes according to a result of the retrieval of the virtual machine, thereby setting a virtual machine suitable for a type and version of the guest operating system to an operable state and a virtual machine not suitable for a type and version of the guest operating system to an operation halt state.

11. A fault recovery method, for use in a multiprocessor system including a main storage and a plurality of virtual machines which are assigned to a plurality of processors under control of a host operating system and a plurality of guest operating systems and which operate on the processors associated therewith, of detecting a fault occurring in one of the processors and thereby recovering functions of the system, the method comprising the steps of:

setting recovery attributes for failure to each of the virtual machines;

operating at least one of the plural virtual machines assigned to a plurality of processors under control of the host operating system and plural guest operating systems;

storing, at detection of occurrence of a fault in one of the processors, data and status information of virtual machines assigned to said one of the processors and status information of said one of the processors from the processor respectively in a virtual machine save area and a real machine save area of the main storage;

reporting the occurrence of the failure to at least one of the plural processors;

storing fault information of said one of the processors in which the fault occurred in the main storage by a fault recovery circuit of the processor having received the report of the fault and causing an interruption in the plural processors other than said one of the processors in which the fault occurred;

restarting, by the processor having received the interruption, an interrupted process of the processor according to the status information of the virtual machines and the status information and fault information of said one of the processors in which the fault occurred and causing an interruption in the host operating system, the information being obtained from the main storage; and retrieving, by the host operating system having received the interruption, one of the virtual machines assigned to said one of the processors in which the fault occurred according to the processor status information in the real machine save area and then assigning the plural virtual machines to the plural processors according to the recovery attributes for failure set to the retrieved virtual machine.

12. A fault recovery method according to claim 11, wherein the recovery attributes at failure include values related to at least two process levels associated with the respective plural virtual machines, the method further including a step of determining, as a result of the retrieval of the virtual machine assigned to said one of the processors in which the fault occurred, a virtual machine having a first attribute value and then arranging contents of the attributes, thereby setting the virtual machine having the first attribute value to an operation halt state.

13. A fault recovery method according to claim 12, further including a step of determining, as a result of the retrieval of the virtual machine assigned to said one of the processors, a virtual machine having a second attribute value and then arranging contents of the attributes, thereby assigning the virtual machine having the second attribute value to one of the plural processors other than the processor in which the failure occurred.

14. A fault recovery method according to claim 13, further including the steps of:

determining which one of the virtual machines and processors is running when the occurrence of a fault in said one of the processors is detected;

setting, when the occurrence of a fault in said one of the processors is detected and when it is determined that a virtual machine was running at the fault occurrence, status information to a flag in the virtual machine save area, the status information including a virtual machine control address and an item indicating validity of the status information, and setting, when the occurrence of a fault in said one of the processors is detected and when it is determined that a processor was running at the fault occurrence, status information to a flag in the virtual machine save area, the status information including an item indicating invalidity of the status information.

15. A fault recovery method according to claim 14, further including a step of referencing the flag by the fault recovery circuit of at least one of the processors having received the fault report and storing, when the invalidity is set to the flag, data and status information of virtual machines assigned to said one of the processors in which the fault occurred and status information of said one of the processors respectively in the virtual machine save area and the real machine save area of the main storage.

16. A fault recovery method according to claim 13, further including a step of arranging the attributes according to a result of the retrieval of the virtual machine, thereby setting a virtual machine suitable for a type and version of the guest operating system to an operable state and a virtual machine not suitable for a type and version of the guest operating system to an operation halt state.

17. A fault recovery method for use in a multiprocessor system including a main storage, a plurality of logical partition resources which are assigned to a plurality of processors under control of a host operating system and a plurality of guest operating systems and which operate on the processors associated therewith when operation modes respectively thereof are altered from a host mode to a guest mode, and a plurality of virtual machines having a multiprocessor configuration in each of the logical partition resources, the method detecting a fault occurring in one of the processors and recovering functions of the system, the method comprising the steps of:

setting recovery attributes for failure to each of the virtual machines;

operating at least one of the plural virtual machines in the logical partition resources assigned to a plurality of processors under control of the host operating system and plural guest operating systems;

storing, at detection of occurrence of a fault in one of the processors, data and status information of virtual machines assigned to said one of the processors and status information of said one of the processors from the processor respectively in a logical partition resource save area and a real machine save area of the main storage;

reporting the occurrence of the failure to at least one of the plural processors;

storing fault information of said one of the processors in which the fault occurred in the logical partition resource save area of the main storage by a fault recovery circuit of the processor having received the report of the fault and causing an interruption in the plural processors other than the processor in which the failure occurred;

restarting, by the processor having received the interruption, an interrupted process of said one of the processors in which the failure occurred according to the status information of the virtual machines and the status information and fault information of said one of the processors in which the failure occurred and causing an interruption in the host operating system, the information being obtained from the main storage; and retrieving, by the host operating system having received the interruption, one of the virtual machines assigned to said one of the processors in which the failure occurred according to the processor status information in the real machine save area, then arranging the attributes, and thereby setting the virtual machine to an operation halt state.

18. A fault recovery method according to claim 17, wherein the recovery attributes at failure include values related to at least two process levels associated with the respective plural virtual machines, the method further including a step of determining, as a result of the retrieval of the virtual machine assigned to said one of the processors in which the failure occurred, a virtual machine having a first attribute value, arranging contents of the attributes, and thereby setting the virtual machine having the first attribute value to an operation halt state.

19. A fault recovery method according to claim 18, further including a step of determining, as a result of the retrieval of the virtual machine assigned to said one of the processors in which the failure occurred, a virtual machine having a second attribute value and then arranging contents of the attributes, arranging contents of the attributes, and thereby assigning the virtual machine having the second attribute value to one of the plural processors other than the processor in which the failure occurred.

20. A fault recovery method according to claim 17, further including the steps of:

storing, by the processor having received the interruption, interruption information including fault information of said one of the processors in which the failure occurred and a guest interruption code in the main storage; and setting, when the fault of the processor is removed and the operation mode is changed from the host mode to the guest mode, the attributes of the operation halt state to an operable state according to a guest interruption due to the guest code.

* * * * *